United States Patent
Chen et al.

(10) Patent No.: US 9,369,064 B2
(45) Date of Patent: Jun. 14, 2016

(54) CURRENT SOURCE INVERTER AND OPERATION METHOD THEREOF

(71) Applicants: DARFON ELECTRONICS (SUZHOU) CO., LTD., Suzhou, Jiangsu Province (CN); DARFON ELECTRONICS CORP., Taoyuan (TW)

(72) Inventors: Yaow-Ming Chen, Taoyuan (TW); Chien-Yao Liao, Taoyuan (TW); Cheng-Yen Chou, Taoyuan (TW)

(73) Assignees: DARFON ELECTRONICS (SUZHOU) CO., LTD., New District, Suzhou, Jiangsu Province (CN); DARFON ELECTRONICS CORP., Gueishan, Taoyuan (TW)

( * ) Notice: Subject to any disclaimer, the term of this patent is extended or adjusted under 35 U.S.C. 154(b) by 162 days.

(21) Appl. No.: 14/272,504

(22) Filed: May 8, 2014

(65) Prior Publication Data

US 2014/0334187 A1    Nov. 13, 2014

(30) Foreign Application Priority Data

May 8, 2013    (TW) .............................. 102116431 A

(51) Int. Cl.
*H02M 7/53* (2006.01)
*H02M 7/48* (2007.01)
*H02M 3/335* (2006.01)

(52) U.S. Cl.
CPC ............ *H02M 7/4807* (2013.01); *H02M 3/335* (2013.01)

(58) Field of Classification Search
CPC ......... H02M 7/42; H02M 7/53; H02M 7/537; H02M 2001/0067; H02M 2001/007; H02M 2007/4815; H02M 7/48

USPC ......... 363/95, 97, 98, 131, 132; 323/266, 906
See application file for complete search history.

(56) References Cited

U.S. PATENT DOCUMENTS

| | | | | |
|---|---|---|---|---|
| 8,405,367 B2* | 3/2013 | Chisenga | ................ | H02J 3/383 323/207 |
| 8,958,221 B2* | 2/2015 | Adam | ................ | H02M 3/3374 363/131 |
| 2011/0261593 A1 | 10/2011 | Pan | | |

FOREIGN PATENT DOCUMENTS

| | | |
|---|---|---|
| CN | 1996711 A | 7/2007 |
| CN | 101267167 B | 7/2010 |
| CN | 102279614 A | 12/2011 |
| CN | 101521394 B | 11/2012 |
| CN | 103066875 A | 4/2013 |

\* cited by examiner

*Primary Examiner* — Gary L Laxton
(74) *Attorney, Agent, or Firm* — Winston Hsu; Scott Margo

(57) ABSTRACT

A current source inverter includes a controller, an input unit, a buffer unit, a modulating unit, and a commutator. The controller generates a switch control signal, an inverse switch control signal, a first pulse width modulation control signal, and a second pulse width modulation control signal. The input unit stores and transmits input power of a direct current power supply according to the first pulse width modulation control signal. The buffer unit is coupled to the input unit for receiving and transmitting the input power. The modulating unit generates and outputs a full-wave rectified sinusoidal current according to the second pulse width modulation control signal and the input power. The commutator converts the full-wave rectified sinusoidal current into an alternating current according to the switch control signal and the inverse switch control signal and outputs the alternating current to a load or a utility line.

32 Claims, 21 Drawing Sheets

CURRENT SOURCE INVERTER AND OPERATION METHOD THEREOF

BACKGROUND OF THE INVENTION

1. Field of the Invention

The present invention relates to a current source inverter and an operation method thereof, and particularly to a current source inverter and an operation method thereof that have advantages of a simple control method, less power conversion times, higher power conversion efficiency, and so on.

2. Description of the Prior Art

Generally speaking, an inverter can convert input power of a direct current power supply into alternating current power, and output the alternating current power to a load or a city main. If a voltage and a current of the load or the city main coupled to the inverter are in phase, a frequency of the alternating current power is two times to a frequency of the voltage and the current of the load or the city main, and the alternating current power can inversely influence the direct current power supply and generate low frequency current ripples on the direct current power supply. If the direct current power supply is a renewable energy (e.g. solar energy or wind energy), the direct current power supply with the low frequency current ripples may reduce efficiency of a maximum power output function of the renewable energy. Therefore, how to design an inverter that can reduce influence on the direct current power supply caused by the alternating current power of the load or the city main becomes an important issue for an inverter designer.

SUMMARY OF THE INVENTION

An embodiment provides a current source inverter. The current source inverter includes a controller, an input unit, a buffer unit, a modulating unit, and a commutator. The controller is used for generating a switch control signal, an inverse switch control signal, a first pulse width modulation control signal, and a second pulse width modulation control signal. The input unit is coupled to a direct current power supply, and used for storing and transmitting input power of the direct current power supply according to the first pulse width modulation control signal. The buffer unit is coupled to the input unit for receiving and transmitting the input power. The modulating unit is coupled to the buffer unit for receiving the input power according to the second pulse width modulation control signal, and generating and outputting a full-wave rectified sinusoidal current according to the input power. The commutator is coupled to the modulating unit for converting the full-wave rectified sinusoidal current into an alternating current according to the switch control signal and the inverse switch control signal, and outputting the alternating current to a load, wherein a frequency of the switch control signal and a frequency of the inverse switch control signal are equal to a frequency of the load. The controller controls an enabling time of the second pulse width modulation control signal according to the sinusoidal current, and an enabling time of the first pulse width modulation control signal is greater than the enabling time of the second pulse width modulation control signal.

Another embodiment provides an operation method of a current source inverter, wherein the current source inverter includes an input unit, a buffer unit, a modulating unit, a controller, and a commutator. The operation method includes the controller generating a first pulse width modulation control signal and a second pulse width modulation control signal; and the input unit executing a first corresponding operation according to the first pulse width modulation control signal, and the modulating unit executing a second corresponding operation and the buffer unit executing a third corresponding operation according to the second pulse width modulation control signal.

The present invention provides a current source inverter and an operation method thereof. The current source inverter and the operation method utilize an input unit to execute a first corresponding operation according to a first pulse width modulation control signal, a modulating unit to execute a second corresponding operation according to a second pulse width modulation control signal, and a buffer unit to execute a third corresponding operation according to the second pulse width modulation control signal. Therefore, compared to the prior art, the present invention has advantages as follows: first, because a controller can control turning-on and turning-off of a first switch and a second switch through the first pulse width modulation control signal and the second pulse width modulation control signal, low frequency current ripples inversely generated by sinusoidal power outputted by the modulating unit modulating unit can be absorbed by the buffer unit, resulting in low frequency current ripple components of input power being decreased, to increase power conversion efficiency of the current source inverter; second, when the current source inverter (isolation type) operates, because a voltage drop of a first capacitor is connected to a voltage drop of a second capacitor in series, the voltage drop of the second capacitor does not need to be higher than a voltage drop of a load, resulting in the second switch easily transmitting power to the load and not enduring stress corresponding to longer turning-on time, and operation range of a direct current power supply being also very large; third, because a first inductor and a second inductor of the current source inverter operate in a continuous current mode (CCM), current stress on the first switch and the second switch is not very large; and fourth, second switches of some current source inverters provided by the present invention can be still turned on through parasitic diodes thereof during a mode III, so the second switches of the some current source inverters provided by the present invention have a zero voltage switching characteristic when the second switches of the some current source inverters provided by the present invention are switched from the mode III to a mode I, resulting in switching loss of the second switches of the some current source inverters provided by the present invention being decreased.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
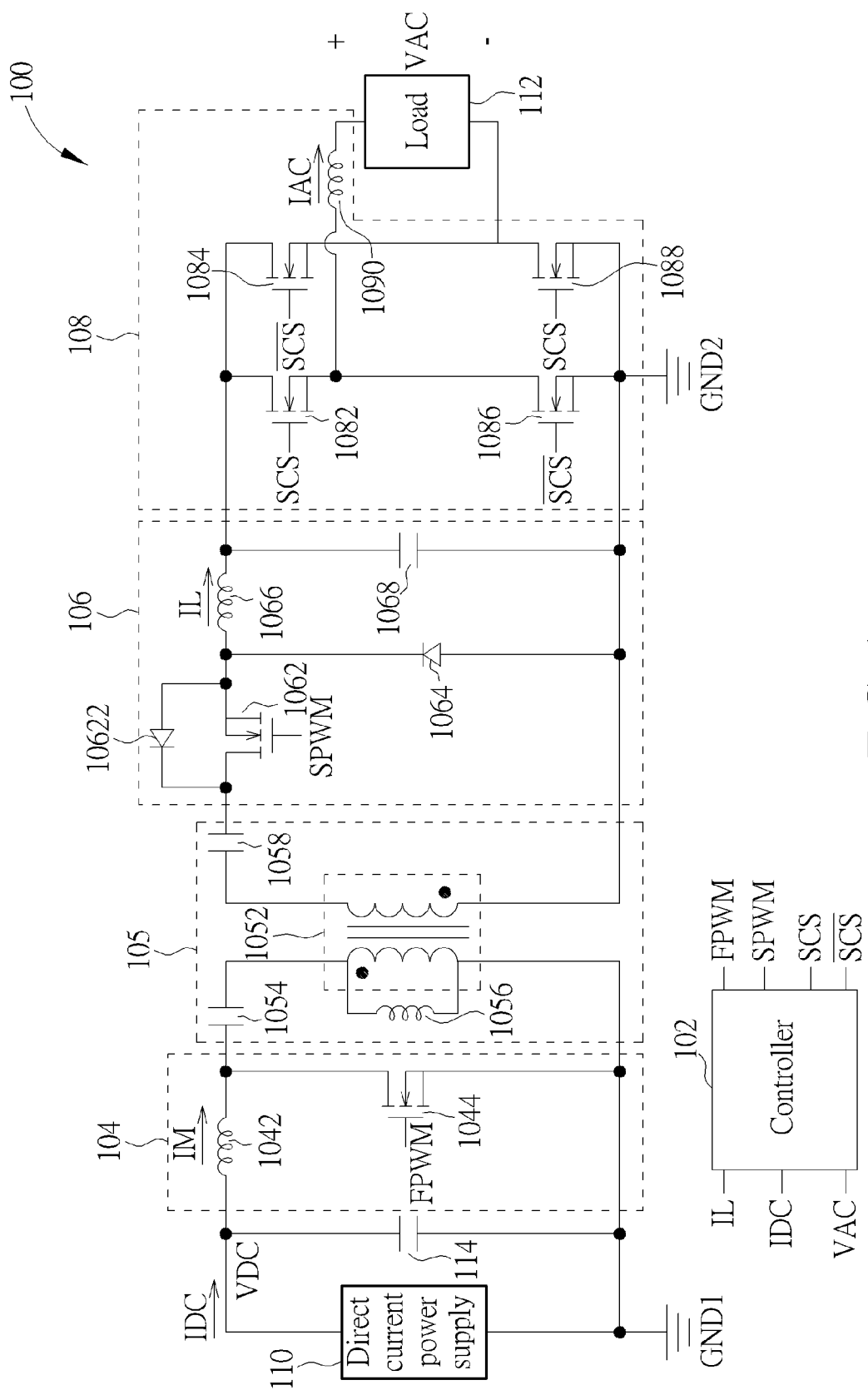
FIG. 1 is a diagram illustrating a current source inverter according to an embodiment.

Please refer to FIG. 1. FIG. 1 is a diagram illustrating a current source inverter 100 (isolation type) according to an embodiment. The current source inverter 100 includes a controller 102, an input unit 104, a buffer unit 105, a modulating unit 106, and a commutator 108. The controller 102 is used for generating a switch control signal SCS, an inverse switch control signal $\overline{SCS}$, a first pulse width modulation control signal FPWM, and a second pulse width modulation control signal SPWM. The input unit 104 is coupled to a direct current power supply 110, and used for storing and transmitting input power PDC of the direct current power supply 110 according to the first pulse width modulation control signal FPWM, wherein the input power PDC is equal to a product of a direct current IDC and a direct current voltage VDC provided by the direct current power supply 110. In addition, the direct current power supply 110 is a solar panel, and the input unit 104 has a maximum power point tracking (MPPT) function, wherein the direct current IDC corresponds to the maximum power point tracking function of the input unit 104. But, the present invention is not limited to the direct current power supply 110 being a solar panel, that is, the direct current power supply 110 can also be any stable direct current power supply. The buffer unit 105 is coupled to the input unit 104 for receiving and transmitting the input power PDC. The modulating unit 106 is coupled to the buffer unit 105 for receiving the input power PDC according to the second pulse width modulation control signal SPWM, and generating and outputting a full-wave rectified second inductor sinusoidal current IL according to the input power PDC. The commutator 108 is coupled to the modulating unit 106 for converting the full-wave rectified second inductor sinusoidal current IL into an alternating current IAC according to the switch control signal SCS and the inverse switch control signal $\overline{SCS}$, and outputting the alternating current IAC to a load 112 (e.g. an alternating current load), wherein a frequency of the switch control signal SCS and a frequency of the inverse switch control signal $\overline{SCS}$ are equal to a frequency of the load 112. But, the present invention is not limited to the current source inverter 100 outputting the alternating current IAC to the alternating current load, that is, the current source inverter 100 can also output the alternating current IAC to a city main.

As shown in FIG. 1, the input unit 104 includes a first inductor 1042 and a first switch 1044. The first inductor 1042 has a first terminal coupled to a first terminal of the direct current power supply 110, and a second terminal. The first switch 1044 has a first terminal coupled to the second terminal of the first inductor 1042, a second terminal for receiving the first pulse width modulation control signal FPWM, and a third terminal coupled to first ground GND1, wherein the first switch 1044 is turned on (ON) and turned off (OFF) according to the first pulse width modulation control signal FPWM.

As shown in FIG. 1, the buffer unit 105 includes a transformer 1052, a first capacitor 1054, a magnetizing inductor 1056, and a second capacitor 1058. The first capacitor 1054 has a first terminal coupled to the second terminal of the first inductor 1042, and a second terminal coupled to the transformer 1052. The magnetizing inductor 1056 has a first terminal coupled to the second terminal of the first capacitor 1054 and the transformer 1052, and a second terminal coupled to the first ground GND1 and the transformer 1052. The second capacitor 1058 has a first terminal coupled to the transformer 1052, and a second terminal coupled to the modulating unit 106.

As shown in FIG. 1, the modulating unit 106 includes a second switch 1062, a first diode 1064, a second inductor 1066, and a third capacitor 1068, wherein the second switch 1062 has a parasitic diode 10622. But, in another embodiment of the present invention, the parasitic diode 10622 can be replaced with a physical diode. The second switch 1062 has a first terminal coupled to the second terminal of the second capacitor 1058, a second terminal for receiving the second pulse width modulation control signal SPWM, and a third terminal, wherein the second switch 1062 is turned on and turned off according to the second pulse width modulation control signal SPWM. The first diode 1064 has a first terminal coupled to second ground GND2, and a second terminal coupled to the third terminal of the second switch 1062. The second inductor 1066 has a first terminal coupled to the second terminal of the first diode 1064, and a second terminal. The third capacitor 1068 has a first terminal coupled to the second terminal of the second inductor 1066, and a second terminal coupled to the second ground GND2.

As shown in FIG. 1, the commutator 108 includes a third switch 1082, a fourth switch 1084, a fifth switch 1086, a sixth switch 1088, and a third inductor 1090. The third switch 1082 has a first terminal coupled to the first terminal of the third capacitor 1068, a second terminal for receiving the switch control signal SCS, and a third terminal. The fourth switch 1084 has a first terminal coupled to the first terminal of the third capacitor 1068, a second terminal for receiving the inverse switch control signal $\overline{SCS}$, and a third terminal coupled to a second terminal of the load 112. The fifth switch 1086 has a first terminal coupled to the third terminal of the third switch 1082, a second terminal for receiving the inverse switch control signal $\overline{SCS}$, and a third terminal coupled to the second ground GND2. The sixth switch 1090 has a first terminal coupled to the third terminal of the fourth switch 1084, a second terminal for receiving the switch control signal SCS, and a third terminal coupled to the second ground GND2. The third inductor 1090 has a first terminal coupled to the third terminal of the third switch 1082, and a second terminal coupled to a first terminal of the load 112, wherein the second inductor 1090 is used for filtering high frequency components of the second inductor sinusoidal current IL of the second inductor 1066.

In addition, as shown in FIG. 1, the inverter 100 further includes a filtering capacitor 114. The filtering capacitor 114 has a first terminal coupled to the first terminal of the direct current power supply 110, and a second terminal coupled to a second terminal of the direct current power supply 110, wherein the filtering capacitor 114 is used for filtering high frequency current ripples flowing through the first inductor 1042, and stabilizing the direct current voltage VDC provided by the direct current power supply 110.

As shown in FIG. 1, the controller 102 controls an enabling time of the first pulse width modulation control signal FPWM according to the direct current IDC and a maximum power point tracking algorithm, controls an enabling time of the second pulse width modulation control signal SPWM according to the second inductor sinusoidal current IL (corresponding to output power PAC, wherein the output power PAC is equal to a product of the alternating current IAC flowing through the load 112 and an alternating current voltage VAC of the load 112), and generates the switch control signal SCS and the inverse switch control signal $\overline{\text{SCS}}$ according to a frequency of the alternating current voltage VAC, wherein the enabling time of the first pulse width modulation control signal FPWM is greater than the enabling time of the second pulse width modulation control signal SPWM.

Figure 2:
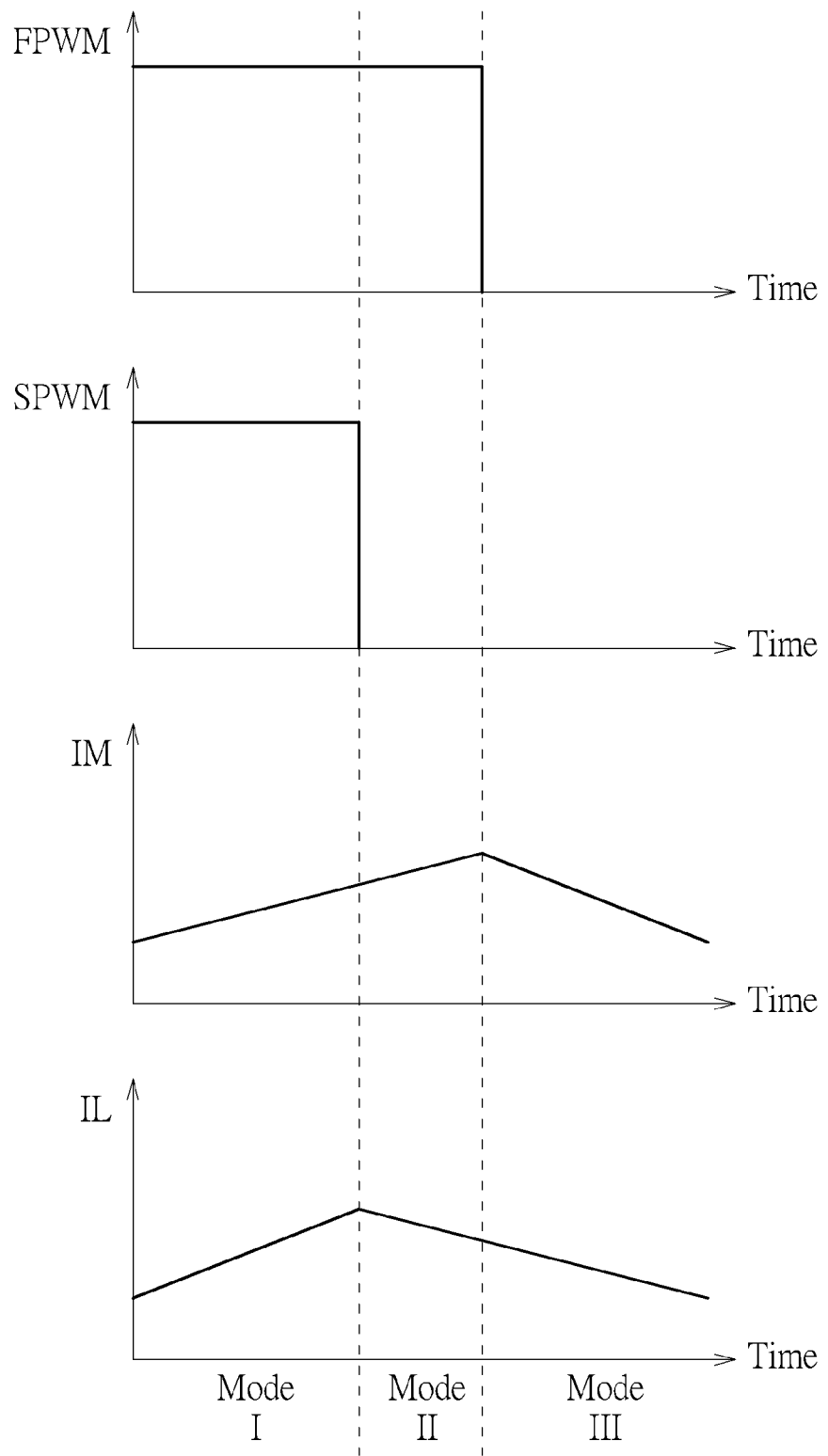
FIG. 2 is a relationship diagram illustrating the first pulse width modulation control signal, the second pulse width modulation control signal, a first inductor current flowing through the first inductor, and the second inductor sinusoidal current flowing through the second inductor.
Figure 3:
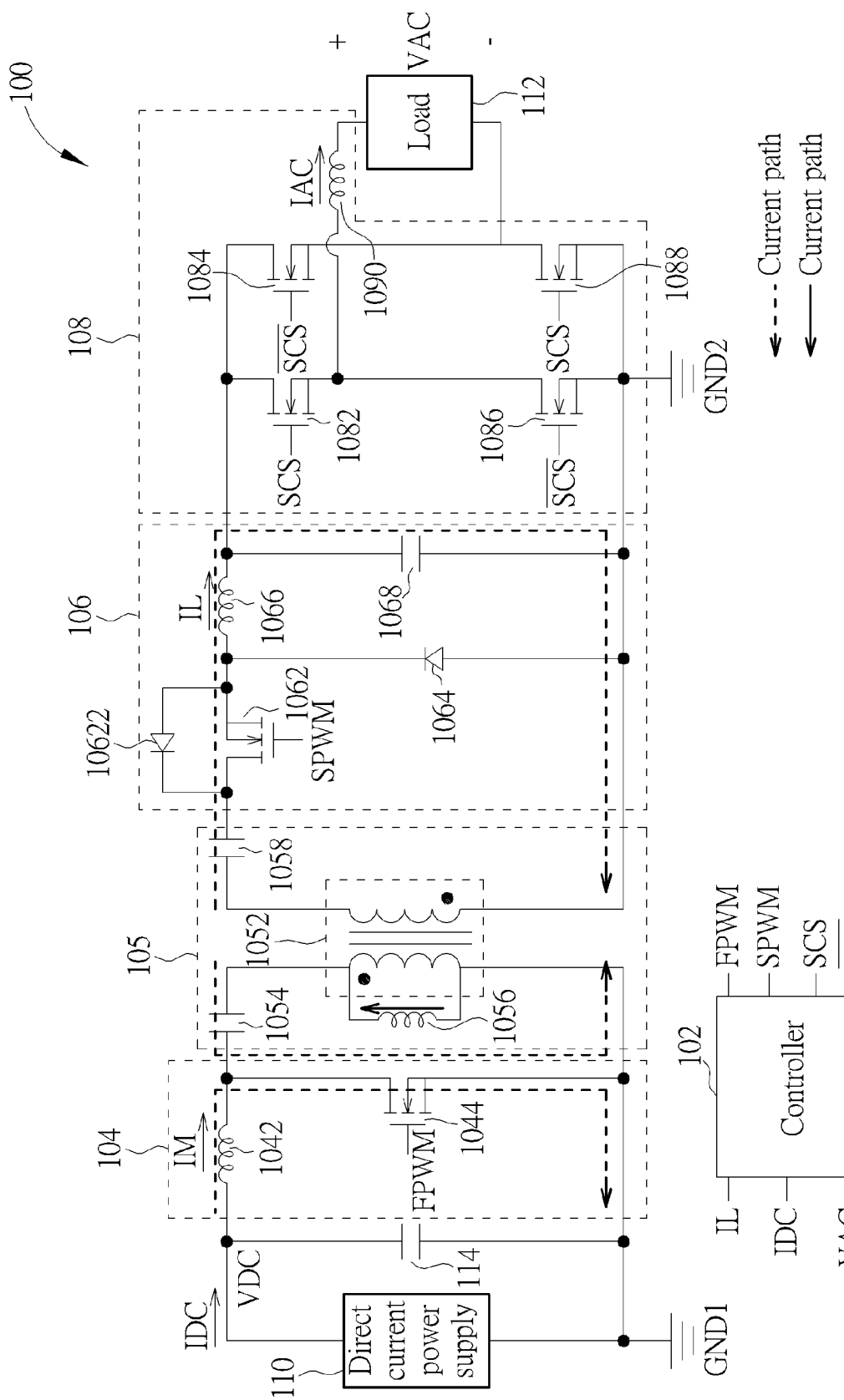
FIG. 3 is a diagram illustrating the current source inverter in a mode I.
Figure 4:
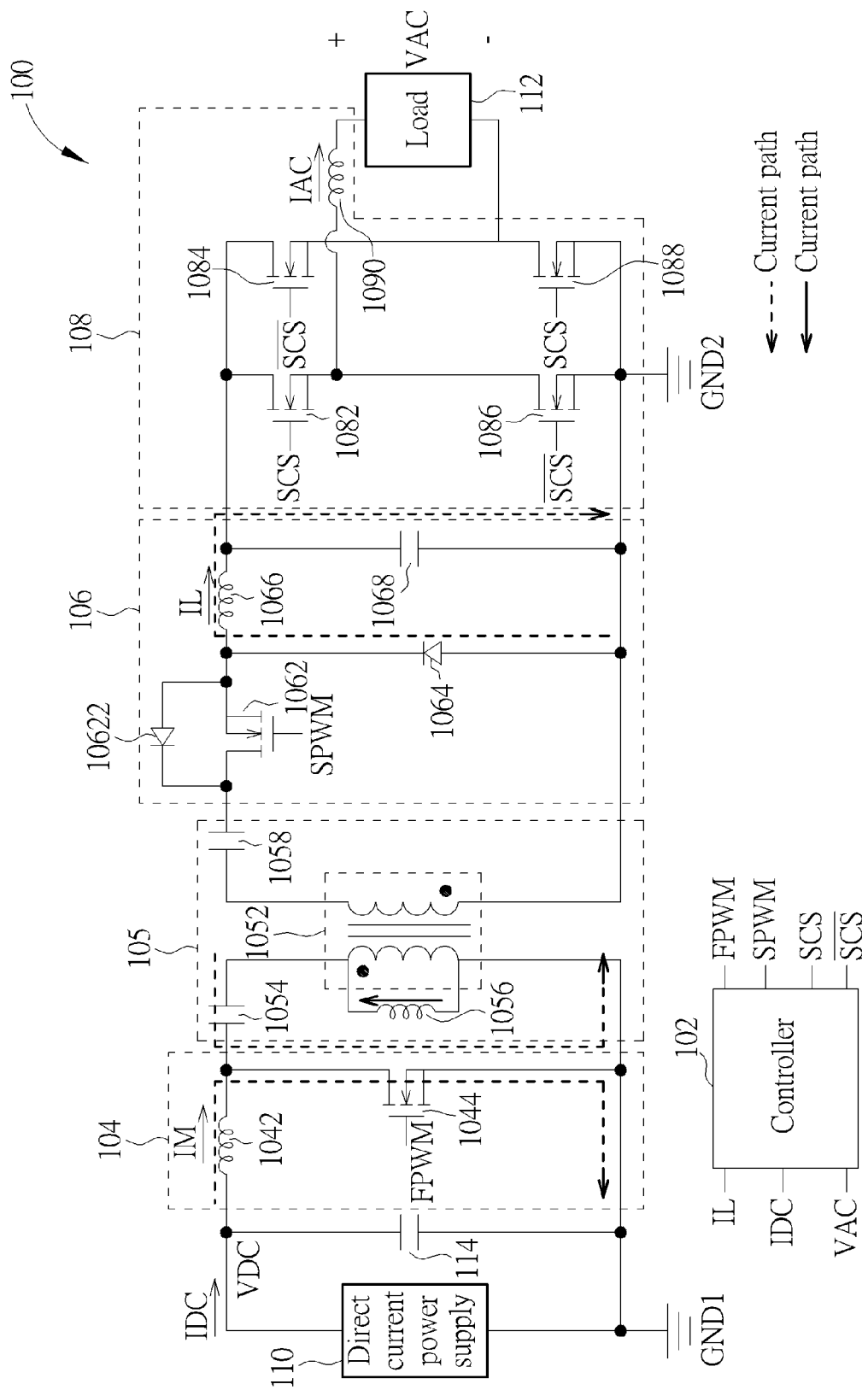
FIG. 4 is a diagram illustrating the current source inverter in a mode II.
Figure 5:
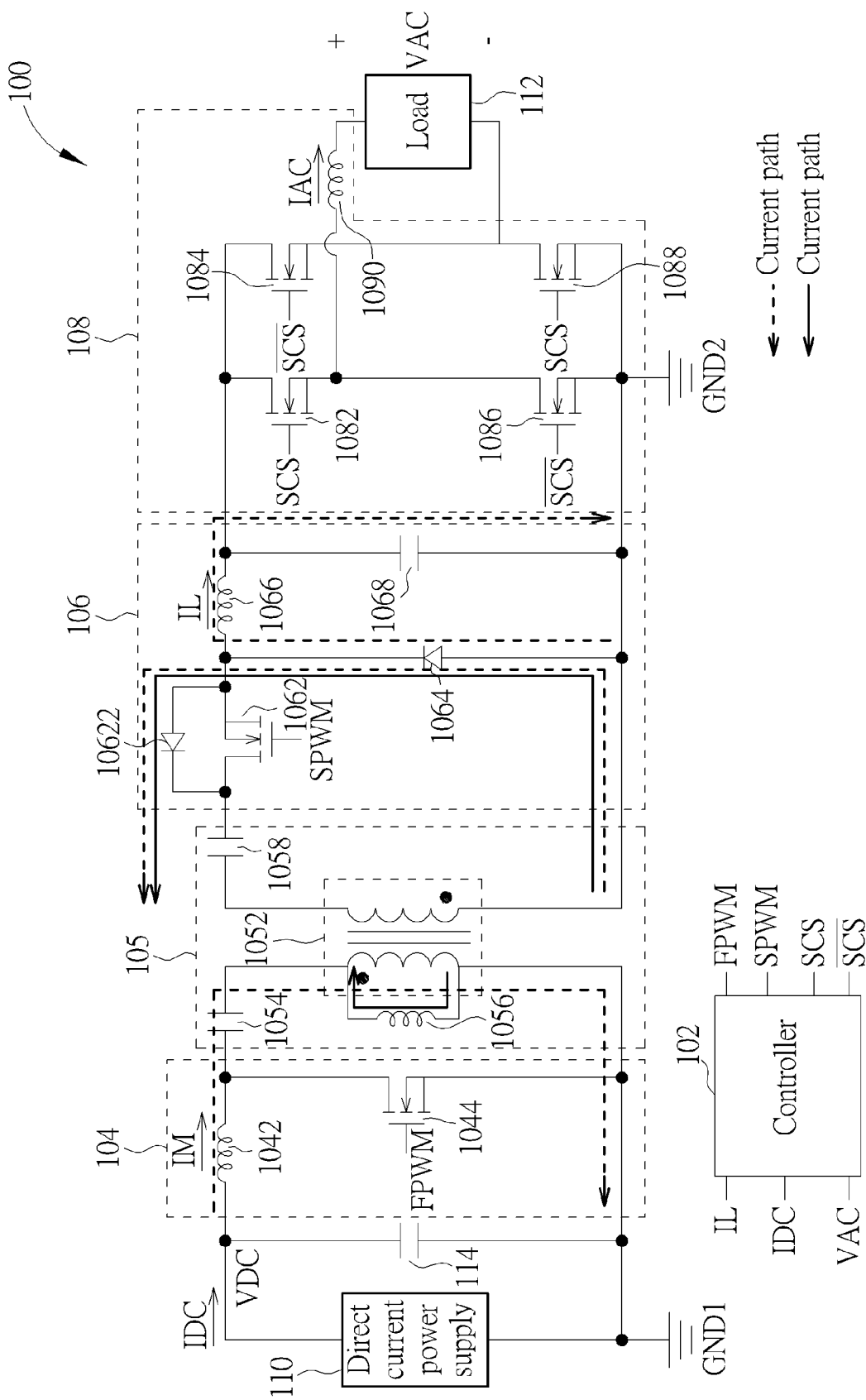
FIG. 5 is a diagram illustrating the current source inverter in a mode III.

Please refer to FIG. 2 to FIG. 5. FIG. 2 is a relationship diagram illustrating the first pulse width modulation control signal FPWM, the second pulse width modulation control signal SPWM, a first inductor current IM flowing through the first inductor 1042, and the second inductor sinusoidal current IL flowing through the second inductor 1066, FIG. 3 is a diagram illustrating the current source inverter 100 in a mode I, FIG. 4 is a diagram illustrating the current source inverter 100 in a mode II, and FIG. 5 is a diagram illustrating the current source inverter 100 in a mode III.

As shown in FIG. 2 and FIG. 3, in the mode I, because the controller 102 enables the first pulse width modulation control signal FPWM and the second pulse width modulation control signal SPWM, the first switch 1044 and the second switch 1062 are turned on. Therefore, the input power PDC of the direct current power supply 110 is stored in the first inductor 1042, a part of power stored in the first capacitor 1054 of the buffer unit 105 is transmitted to the magnetizing inductor 1056 of the buffer unit 105 and the second inductor 1066 of the modulating unit 106, other part of the power stored in the first capacitor 1054 of the buffer unit 105 is transmitted to the commutator 108 through the modulating unit 106, a part of power stored in the second capacitor 1058 of the buffer unit 105 is transmitted to the second inductor 1066 of the modulating unit 106, and other part of the power stored in the second capacitor 1058 of the buffer unit 105 is transmitted to the commutator 108 through the modulating unit 106. Meanwhile, the first capacitor 1054 of the buffer unit 105 charges the magnetizing inductor 1056 of the buffer unit 105. Therefore, the part of the power stored in the first capacitor 1054 is stored in the second inductor 1066 and the magnetizing inductor 1056, and the other part of the power stored in the first capacitor 1054 is transmitted to the commutator 108 through the second inductor sinusoidal current IL of the modulating unit 106. The part of the power stored in the second capacitor 1058 is stored in the second inductor 1066, and the other part of the power stored in the second capacitor 1058 is transmitted to the commutator 108 through the second inductor sinusoidal current IL of the modulating unit 106. Because the input power PDC of the direct current power supply 110 is stored in the first inductor 1042, the first inductor current IM flowing through the first inductor 1042 is increased (as shown in FIG. 2). In addition, because the part of the power stored in the first capacitor 1054 is stored in the second inductor 1066 and the part of the power stored in the second capacitor 1058 is stored in the second inductor 1066, the second inductor sinusoidal current IL flowing through the second inductor 1066 is also increased (as shown in FIG. 2). In addition, in the model, the controller 102 can determine a turning-on time of the first switch 1044 (that is, the enabling time of the first pulse width modulation control signal FPWM) according to the direct current IDC and the maximum power point tracking algorithm, and the controller 102 can control a turning-on time of the second switch 1062 according to the second inductor sinusoidal current IL.

As shown in FIG. 2 and FIG. 4, in the mode II, when the output power PAC of the load 112 is satisfied, the controller 102 enables the first pulse width modulation control signal FPWM and disables the second pulse width modulation control signal SPWM, so the first switch 1044 is turned on and the second switch 1062 is turned off. Therefore, when the second switch 1062 is turned off, the alternating current IAC is generated by the first diode 1064, the third capacitor 1068, and the second inductor 1066, so power stored in the second inductor 1066 can be transmitted to the commutator 108 through the second inductor sinusoidal current IL. But, because the direct current IDC is not yet increased to a direct current corresponding to a maximum power point of the direct current power supply 110, the first switch 1044 is continuously turned on, resulting in the input power PDC of the direct current power supply 110 being continuously stored in the first inductor 1042, and the power stored in the first capacitor 1054 of the buffer unit 105 being transmitted to the magnetizing inductor 1056 of the buffer unit 105 through the first switch 1044 (that is, the first capacitor 1054 of the buffer unit 105 continuously keeps charging the magnetizing inductor 1056 of the buffer unit 105). Because the input power PDC of the direct current power supply 110 is continuously stored in the first inductor 1042, the first inductor current IM flowing through the first inductor 1042 is continuously increased (as shown in FIG. 2). In addition, because the power stored in the second inductor 1066 is transmitted to the commutator 108, the second inductor sinusoidal current IL flowing through the second inductor 1066 is decreased (as shown in FIG. 2).

As shown in FIG. 2 and FIG. 5, in the mode III, when the direct current IDC is increased to the direct current corresponding to the maximum power point of the direct current power supply 110, the controller 102 disables the first pulse width modulation control signal FPWM and the second pulse width modulation control signal SPWM, so the first switch 1044 and the second switch 1062 are turned off. Therefore, when the second switch 1062 is turned off, the alternating current IAC is generated by the first diode 1064, the third capacitor 1068, and the second inductor 1066, so the power stored in the second inductor 1066 can be transmitted to the commutator 108. Because the first switch 1044 is turned off, power stored in the first inductor 1042 is stored in the first capacitor 1054 and stored in the second capacitor 1058 through the transformer 1052, the parasitic diode 10622 of the second switch 1062, and the first diode 1064. In addition, the power stored in the magnetizing inductor 1056 can also be stored in the second capacitor 1058 through the transformer 1052, the parasitic diode 10622 of the second switch 1062, and the first diode 1064. Because the power stored in the first inductor 1042 is stored in the first capacitor 1054 and stored in the second capacitor 1058 through the transformer 1052, the parasitic diode 10622 of the second switch 1062, and the first diode 1064, the first inductor current IM flowing through the first inductor 1042 is decreased (as shown in FIG. 2). Because the power stored in the second inductor 1066 is transmitted to the commutator 108, the second inductor sinusoidal current IL flowing through the second inductor 1066 is decreased (as shown in FIG. 2).

According to the mode I, the mode II, and the mode III of the current source inverter 100, because the controller 102 can control turning-on and turning-off of the first switch 1044 and the second switch 1062 through the first pulse width modulation control signal FPWM and the second pulse width modulation control signal SPWM, low frequency current ripples inversely generated by sinusoidal power outputted by the modulating unit 106 can be absorbed by the buffer unit 105, resulting in low frequency current ripple components of the input power PDC being decreased.

Figure 6:
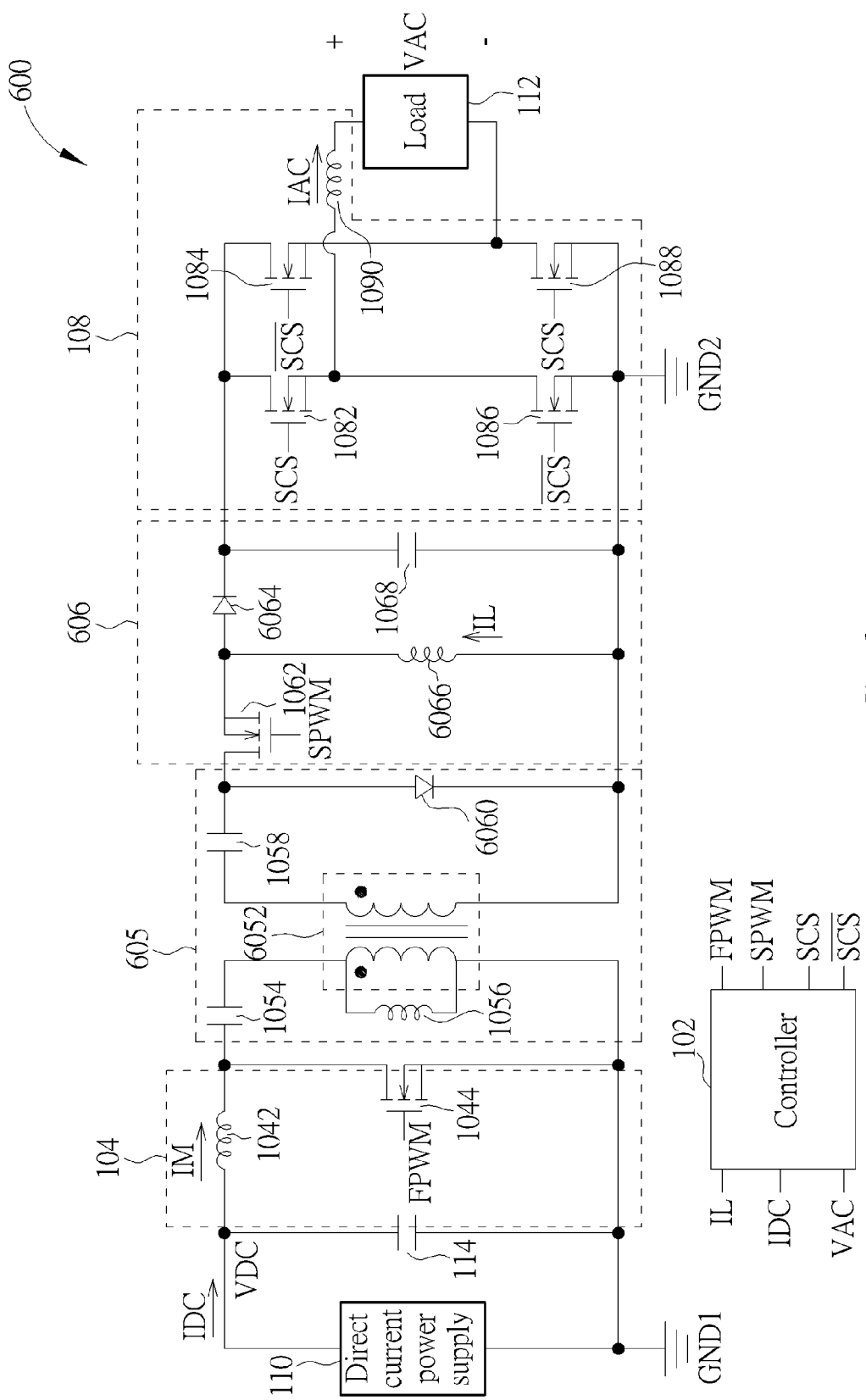
FIG. 6 is a diagram illustrating a current source inverter according to another embodiment.

Please refer to FIG. 6. FIG. 6 is a diagram illustrating a current source inverter 600 (isolation type) according to another embodiment. As shown in FIG. 6, a difference between the current source inverter 600 and the current source inverter 100 is that a buffer unit 605 and a modulating unit 606 of the current source inverter 600 are different from the buffer unit 105 and the modulating unit 606 of the current source inverter 100. As shown in FIG. 6, the buffer unit 605 includes a transformer 6052, a first capacitor 1054, a magnetizing inductor 1056, a second capacitor 1058, and a first diode 6060. The first capacitor 1054 has a first terminal coupled to the second terminal of the first inductor 1042, and a second terminal coupled to transformer 6052. The magnetizing inductor 1056 has a first terminal coupled to the second terminal of the first capacitor 1054 and the transformer 6052, and a second terminal coupled to the first ground GND1 and the transformer 6052. The second capacitor 1058 has a first terminal coupled to the transformer 6052, and a second terminal coupled to the modulating unit 606. The first diode 6060 has a first terminal coupled to the second terminal of the second capacitor 1058, and a second terminal coupled to the second ground GND2.

As shown in FIG. 6, the modulating unit 606 includes a second switch 1062, a second diode 6064, a second inductor 6066, and a third capacitor 1068. The second switch 1062 has a first terminal coupled to the second terminal of the second capacitor 1058, a second terminal for receiving the second pulse width modulation control signal SPWM, and a third terminal, wherein the second switch 1062 is turned on and turned off according to the second pulse width modulation control signal SPWM. The second diode 6064 has a first terminal coupled to the third terminal of the second switch 1062, and a second terminal. The second inductor 6066 has a first terminal coupled to the third terminal of the second switch 1062, and a second terminal coupled to the second the ground GND2. The third capacitor 1068 has a first terminal coupled to the second terminal of the second diode 6064, and a second terminal coupled to the second ground GND2.

Figure 7:
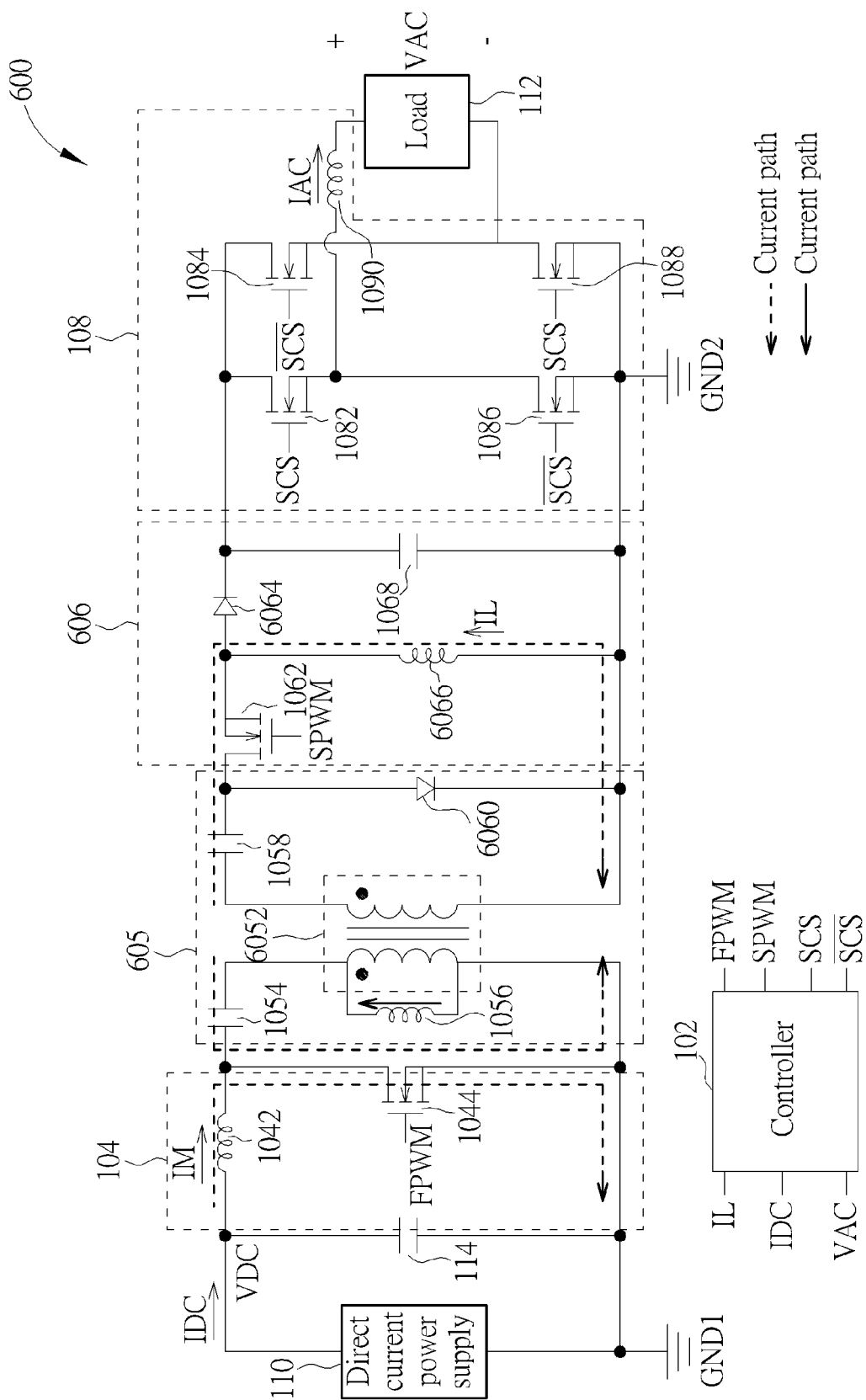
FIG. 7 is a diagram illustrating the current source inverter in a mode I.
Figure 8:
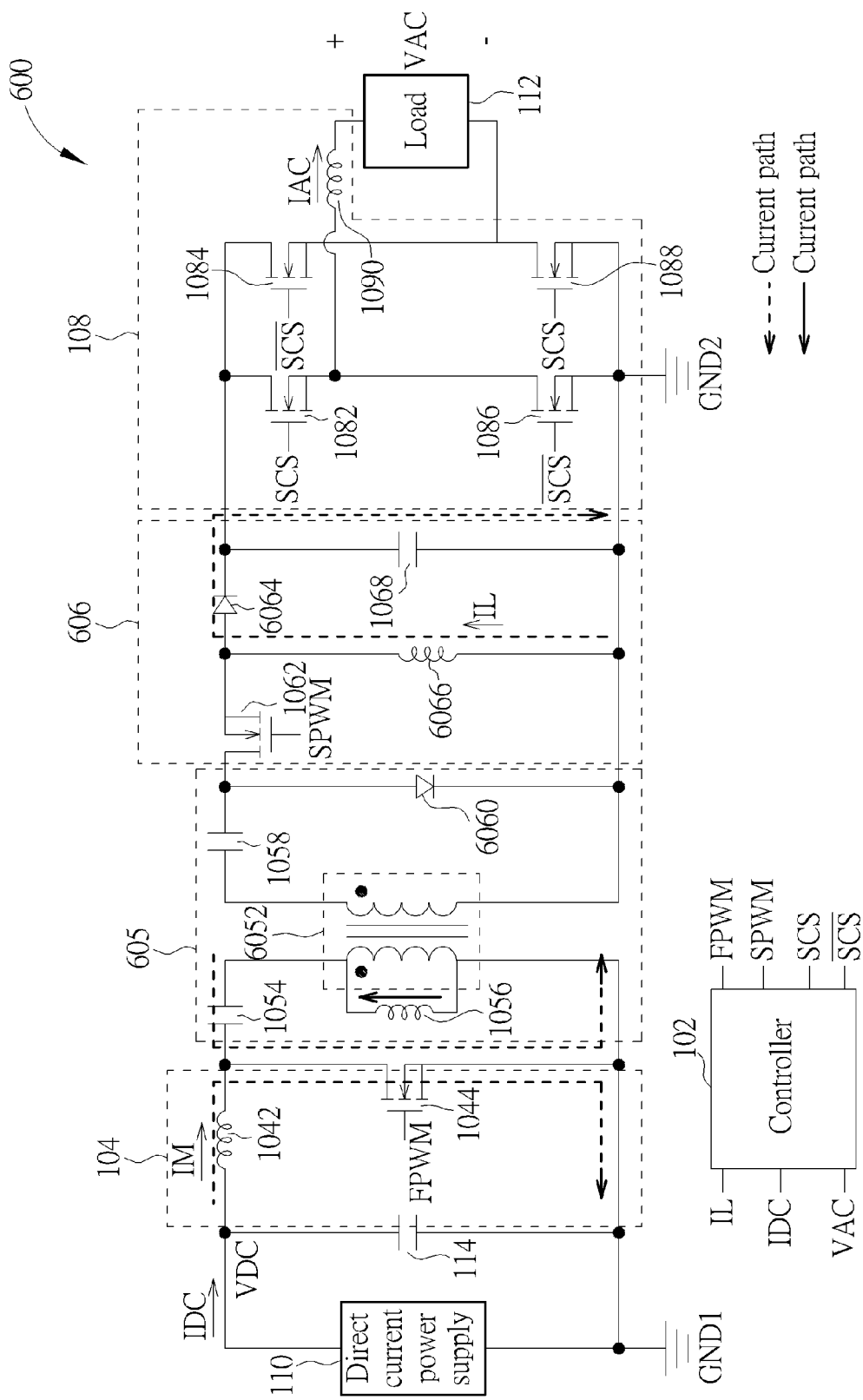
FIG. 8 is a diagram illustrating the current source inverter in a mode II.
Figure 9:
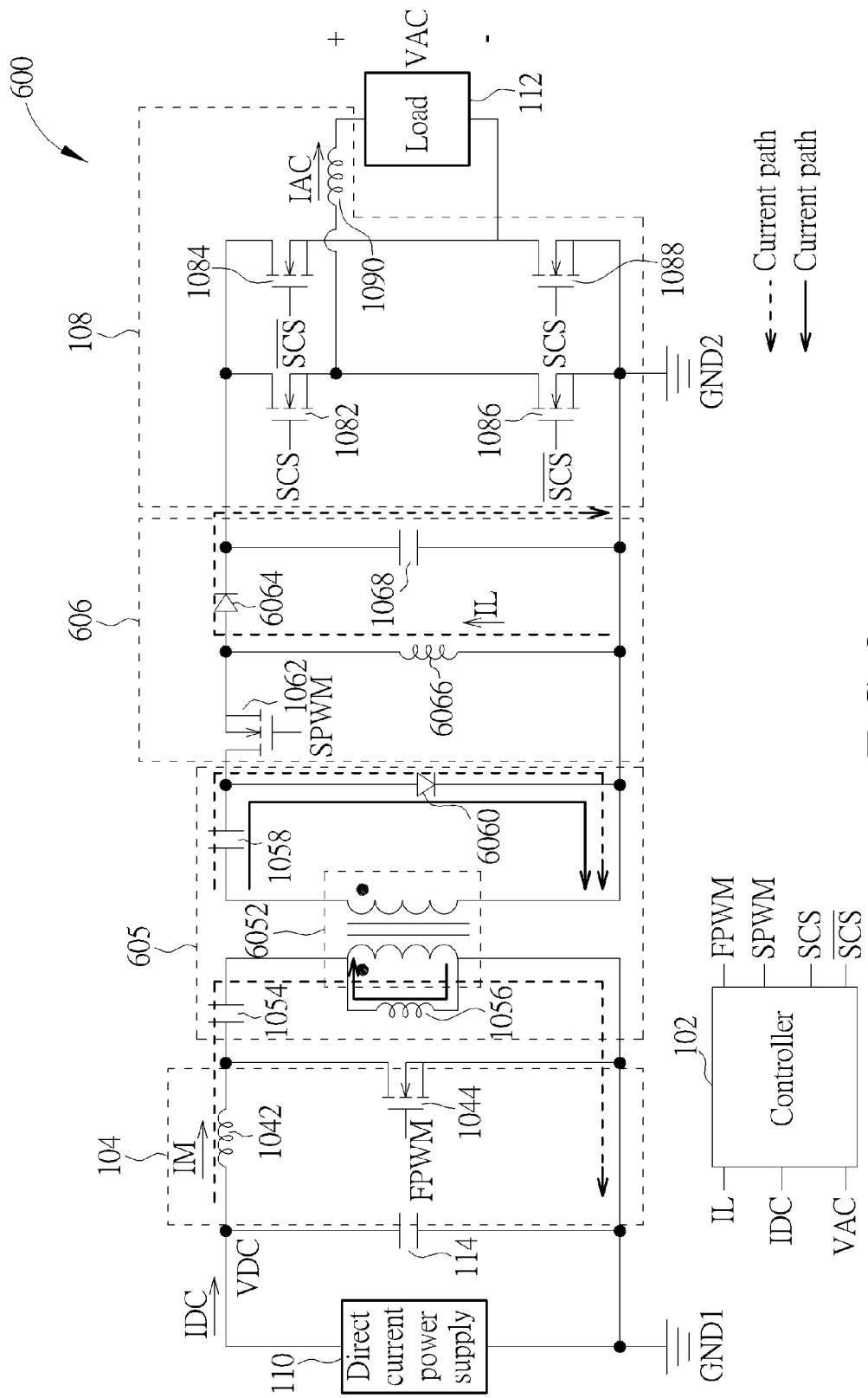
FIG. 9 is a diagram illustrating the current source inverter in a mode III.

Please refer to FIG. 7 to FIG. 9. FIG. 7 is a diagram illustrating the current source inverter 600 in a mode I, FIG. 8 is a diagram illustrating the current source inverter 600 in a mode II, and FIG. 9 is a diagram illustrating the current source inverter 600 in a mode III.

As shown in FIG. 2 and FIG. 7, in the mode I, because the controller 102 enables the first pulse width modulation control signal FPWM and the second pulse width modulation control signal SPWM, the first switch 1044 and the second switch 1062 are turned on. Therefore, the input power PDC of the direct current power supply 110 is stored in the first inductor 1042, a part of power stored in the first capacitor 1054 of the buffer unit 605 is transmitted to the magnetizing inductor 1056 of the buffer unit 605 and the second inductor 6066 of the modulating unit 606, other part of the power stored in the first capacitor 1054 of the buffer unit 605 is transmitted to the commutator 108 through the modulating unit 606, a part of power stored in the second capacitor 1058 of the buffer unit 605 is transmitted to the second inductor 6066 of the modulating unit 606, and other part of the power stored in the second capacitor 1058 of the buffer unit 605 is transmitted to the commutator 108 through the modulating unit 606. Meanwhile, the first capacitor 1054 of the buffer unit 605 charges the magnetizing inductor 1056 of the buffer unit 605. Therefore, the part of the power stored in the first capacitor 1054 is stored in the second inductor 6066 and the magnetizing inductor 1056, and the other part of the power stored in the first capacitor 1054 is transmitted to the commutator 108 through a second inductor sinusoidal current IL of the modulating unit 606. The part of the power stored in the second capacitor 1058 is stored in the second inductor 6066, and the other part of the power stored in the second capacitor 1058 is transmitted to the commutator 108 through the second inductor sinusoidal current IL of the modulating unit 606. Because the input power PDC of the direct current power supply 110 is stored in the first inductor 1042, the first inductor current IM flowing through the first inductor 1042 is increased (as shown in FIG. 2). In addition, because the part of the power stored in the first capacitor 1054 is stored in the second inductor 6066 and the part of the power stored in the second capacitor 1058 is stored in the second inductor 6066, the second inductor sinusoidal current IL flowing through the second inductor 1066 is also increased (as shown in FIG. 2).

As shown in FIG. 2 and FIG. 8, in the mode II, when the output power PAC of the load 112 is satisfied, the controller 102 enables the first pulse width modulation control signal FPWM and disables the second pulse width modulation control signal SPWM, so the first switch 1044 is turned on and the second switch 1062 is turned off. Therefore, when the second switch 1062 is turned off, the alternating current IAC is generated by the second diode 6064, the third capacitor 1068, and the second inductor 6066, so power stored in the second inductor 6066 can be transmitted to the commutator 108. But, because the direct current IDC is not yet increased to the direct current corresponding to the maximum power point of the direct current power supply 110, the first switch 1044 is continuously turned on, resulting in the input power PDC of the direct current power supply 110 being continuously stored in the first inductor 1042, and the power stored in the first capacitor 1054 of the buffer unit 105 being transmitted to the magnetizing inductor 1056 of the buffer unit 605 through the first switch 1044 (that is, the first capacitor 1054 of the buffer unit 605 continuously keeps charging the magnetizing inductor 1056 of the buffer unit 605). Because the input power PDC of the direct current power supply 110 is continuously stored in the first inductor 1042, the first inductor current IM flowing through the first inductor 1042 is continuously increased (as shown in FIG. 2). In addition, because the power stored in the second inductor 6066 is transmitted to the commutator 108, the second inductor sinusoidal current IL flowing through the second inductor 6066 is decreased (as shown in FIG. 2).

As shown in FIG. 2 and FIG. 9, in the mode III, when the direct current IDC is increased to the direct current corresponding to the maximum power point of the direct current power supply 110, the controller 102 disables the first pulse width modulation control signal FPWM and the second pulse width modulation control signal SPWM, so the first switch 1044 and the second switch 1062 are turned off. Therefore, when the second switch 1062 is turned off, the alternating current IAC is generated by the second diode 6064, the third capacitor 1068, and the second inductor 6066, so the power stored in the second inductor 6066 can be transmitted to the commutator 108. Because the first switch 1044 is turned off, the power stored in the first inductor 1042 is stored in the first capacitor 1054 and stored in the second capacitor 1058 through the transformer 6052 and the first diode 6060. In addition, the power stored in the magnetizing inductor 1056 can also be stored in the second capacitor 1058 through the transformer 6052 and the first diode 6060. Because the power stored in the first inductor 1042 is stored in the first capacitor 1054 and stored in the second capacitor 1058 through the transformer 6052 and the first diode 6060, the first inductor current IM flowing through the first inductor 1042 is decreased (as shown in FIG. 2); and because the power stored in the second inductor 6066 is transmitted to the commutator 108, the second inductor sinusoidal current IL flowing through the second inductor 6066 is decreased (as shown in FIG. 2).

According to the mode I, the mode II, and the mode III of the current source inverter 600, because the controller 102 can control turning-on and turning-off of the first switch 1044 and the second switch 1062 through the first pulse width modulation control signal FPWM and the second pulse width modulation control signal SPWM, low frequency current ripples inversely generated by sinusoidal power outputted by the modulating unit 606 can be absorbed by the buffer unit 605, resulting in low frequency current ripple components of the input power PDC being decreased.

Figure 10:
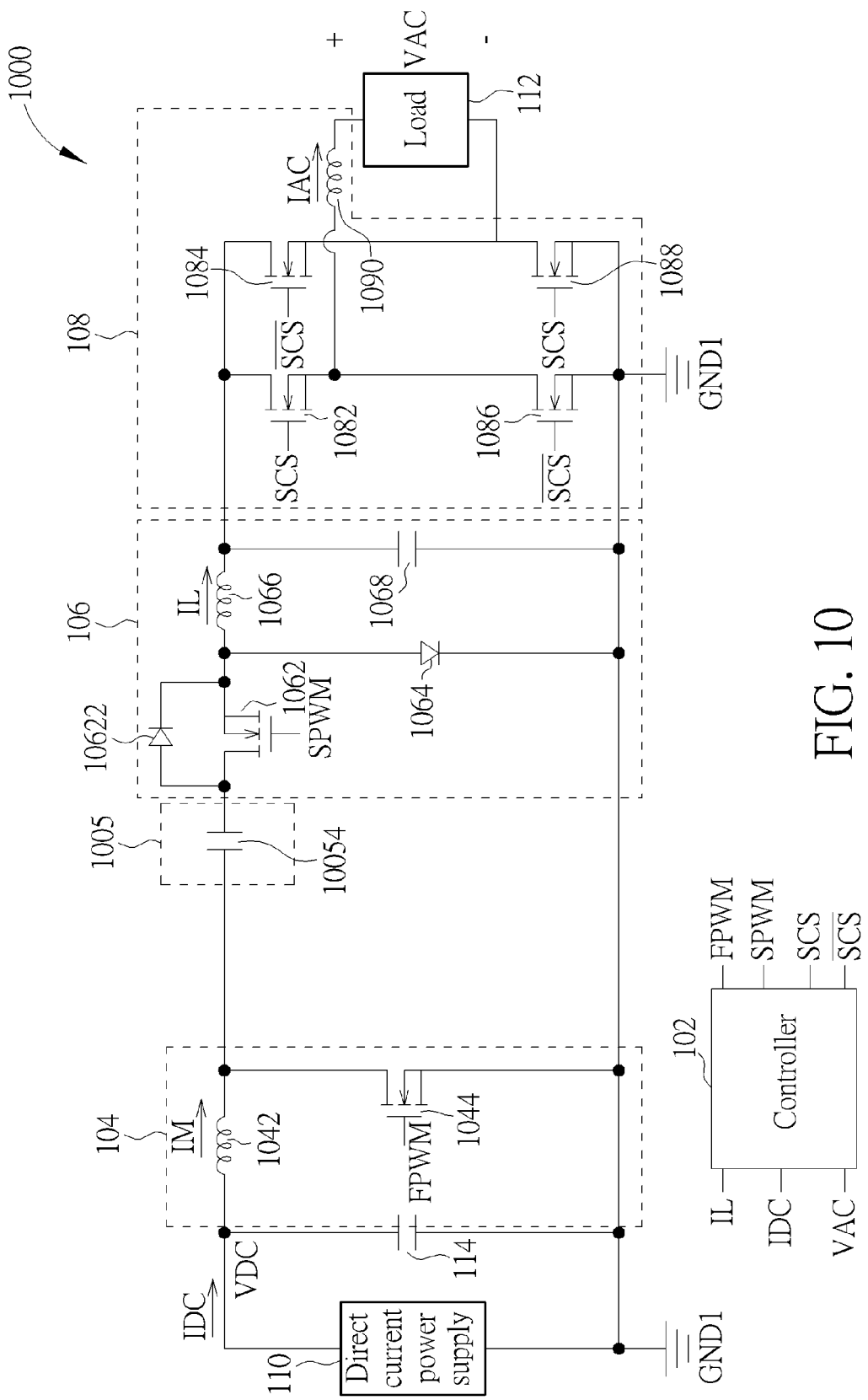
FIG. 10 is a diagram illustrating a current source inverter according to another embodiment.

Please refer to FIG. 10. FIG. 10 is a diagram illustrating a current source inverter 1000 (non-isolation type) according to another embodiment. As shown in FIG. 10, a difference between the current source inverter 1000 and the current source inverter 100 is that a buffer unit 1005 of the current source inverter 1000 is different from the buffer unit 105 of the current source inverter 100. As shown in FIG. 10, the buffer unit 1005 includes a first capacitor 10054. The first capacitor 10054 has a first terminal coupled to the second terminal of the first inductor 1042, and a second terminal coupled to the modulating unit 106.

Figure 11:
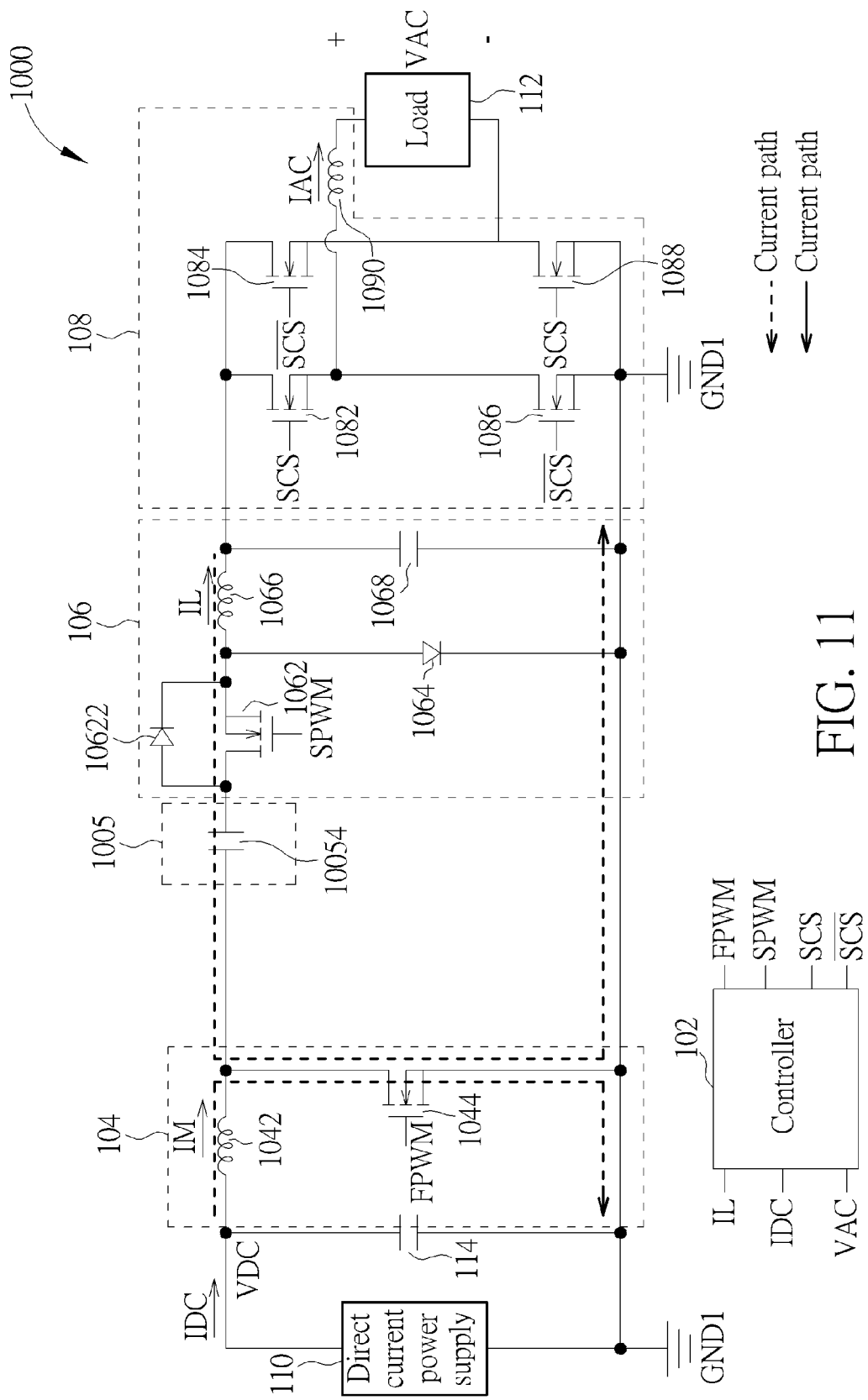
FIG. 11 is a diagram illustrating the current source inverter in a mode I.
Figure 12:
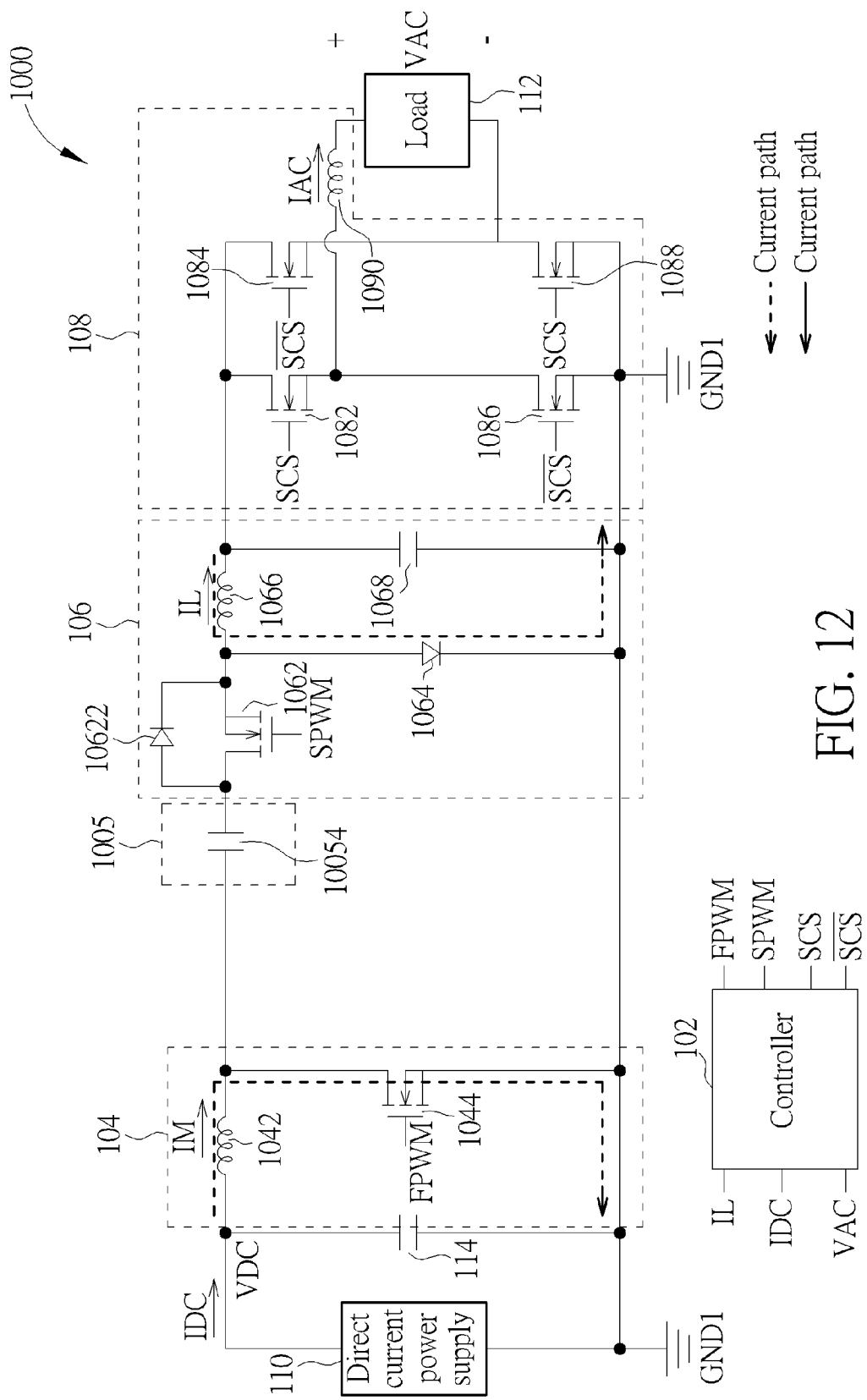
FIG. 12 is a diagram illustrating the current source inverter in a mode II.
Figure 13:
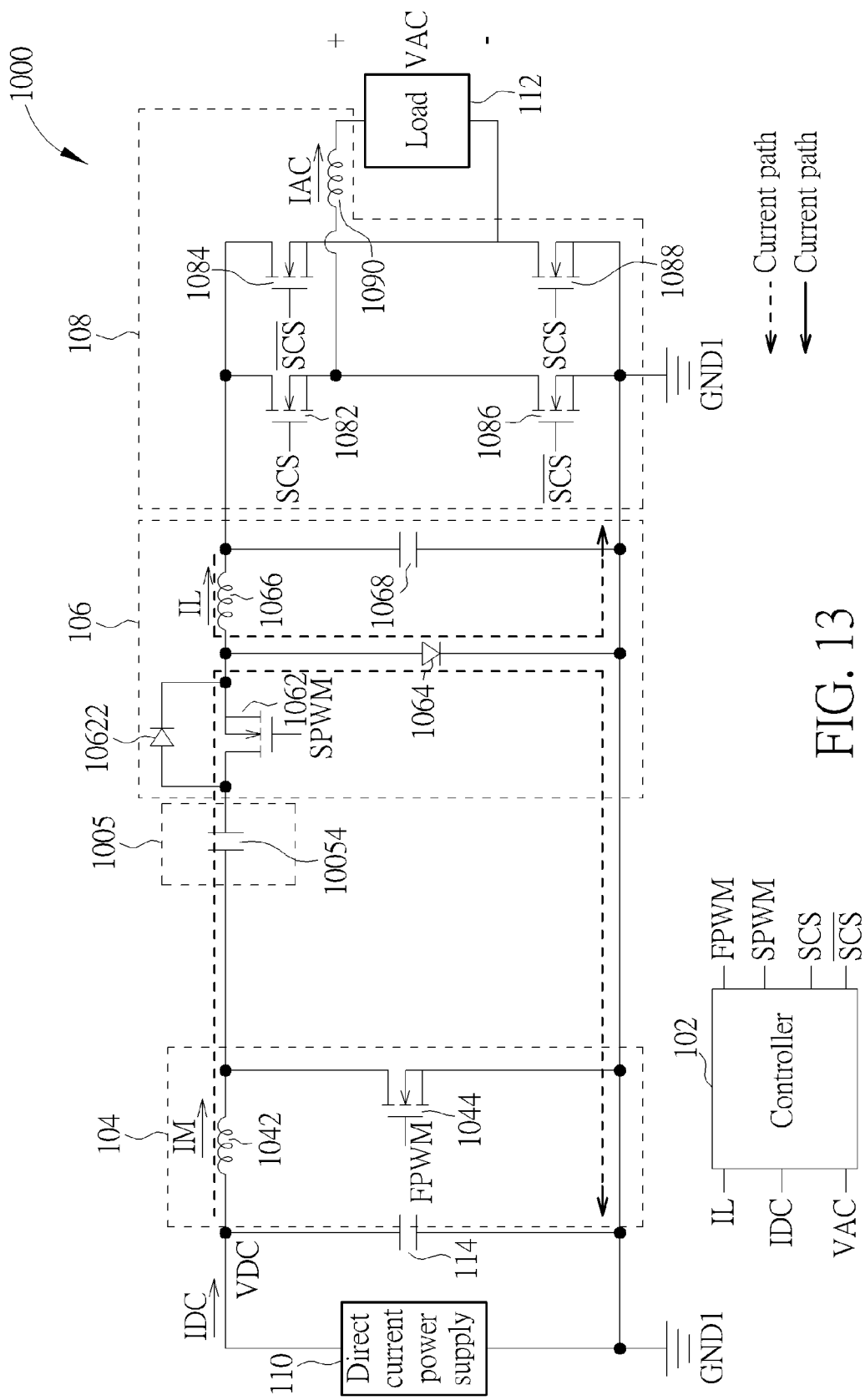
FIG. 13 is a diagram illustrating the current source inverter in a mode III.

Please refer to FIG. 11 to FIG. 13. FIG. 11 is a diagram illustrating the current source inverter 1000 in a mode I, FIG. 12 is a diagram illustrating the current source inverter 1000 in a mode II, and FIG. 13 is a diagram illustrating the current source inverter 1000 in a mode III.

As shown in FIG. 2 and FIG. 11, in the mode I, because the controller 102 enables the first pulse width modulation control signal FPWM and the second pulse width modulation control signal SPWM, the first switch 1044 and the second switch 1062 are turned on. Therefore, the input power PDC of the direct current power supply 110 is stored in the first inductor 1042, a part of power stored in the first capacitor 10054 of the buffer unit 1005 is transmitted to the second inductor 1066 of the modulating unit 106, and other part of the power stored in the first capacitor 10054 of the buffer unit 1005 is transmitted to the commutator 108 through the second inductor sinusoidal current IL of the modulating unit 106. Because the input power PDC of the direct current power supply 110 is continuously stored in the first inductor 1042, the first inductor current IM flowing through the first inductor 1042 is increased (as shown in FIG. 2). In addition, because the part of the power stored in the first capacitor 10054 of the buffer unit 1005 is stored in the second inductor 1066 of the modulating unit 106, the second inductor sinusoidal current IL flowing through the second inductor 1066 is also increased (as shown in FIG. 2).

As shown in FIG. 2 and FIG. 12, in the mode II, when the output power PAC of the load 112 is satisfied, the controller 102 enables the first pulse width modulation control signal FPWM and disables the second pulse width modulation control signal SPWM, so the first switch 1044 is turned on and the second switch 1062 is turned off. Therefore, when the second switch 1062 is turned off, the alternating current IAC is generated by the first diode 1064, third capacitor 1068, and the second inductor 1066, so the power stored in the second inductor 1066 can be transmitted to the commutator 108. But, because the direct current IDC is not yet increased to the direct current corresponding to the maximum power point of the direct current power supply 110, the first switch 1044 is continuously turned on, resulting in the input power PDC of the direct current power supply 110 being continuously stored in the first inductor 1042. Because the input power PDC of the direct current power supply 110 is continuously stored in the first inductor 1042, the first inductor current IM flowing through the first inductor 1042 is increased continuously (as shown in FIG. 2). In addition, because the power stored in the second inductor 1066 is transmitted to the commutator 108, the second inductor sinusoidal current IL flowing through the second inductor 1066 is decreased (as shown in FIG. 2).

As shown in FIG. 2 and FIG. 13, in the mode III, when the direct current IDC is increased to the direct current corresponding to the maximum power point of the direct current power supply 110, the controller 102 disables the first pulse width modulation control signal FPWM and the second pulse width modulation control signal SPWM, so the first switch 1044 and the second switch 1062 are turned off. Therefore, when the second switch 1062 is turned off, the alternating current IAC is generated by the first diode 1064, the third capacitor 1068, and the second inductor 1066, so the power stored in the second inductor 1066 can be transmitted to the commutator 108. Because the first switch 1044 is turned off, the power stored in the first inductor 1042 is stored in the first capacitor 10054 through the parasitic diode 10622 of the second switch 1062 and the first diode 1064. Because the power stored in the first inductor 1042 is stored in the first capacitor 10054, the first inductor current IM flowing through the first inductor 1042 is decreased (as shown in FIG. 2); and because the power stored in the second inductor 1066 is transmitted to the commutator 108, the second inductor sinusoidal current IL flowing through the second inductor 1066 is decreased (as shown in FIG. 2).

According to the mode I, the mode II, and the mode III of the current source inverter 1000, because the controller 102 can control turning-on and turning-off of the first switch 1044 and the second switch 1062 through the first pulse width modulation control signal FPWM and the second pulse width modulation control signal SPWM, low frequency current ripples inversely generated by sinusoidal power outputted by the modulating unit 106 can be absorbed by the buffer unit 1005, resulting in low frequency current ripple components of the input power PDC being decreased.

Figure 14:
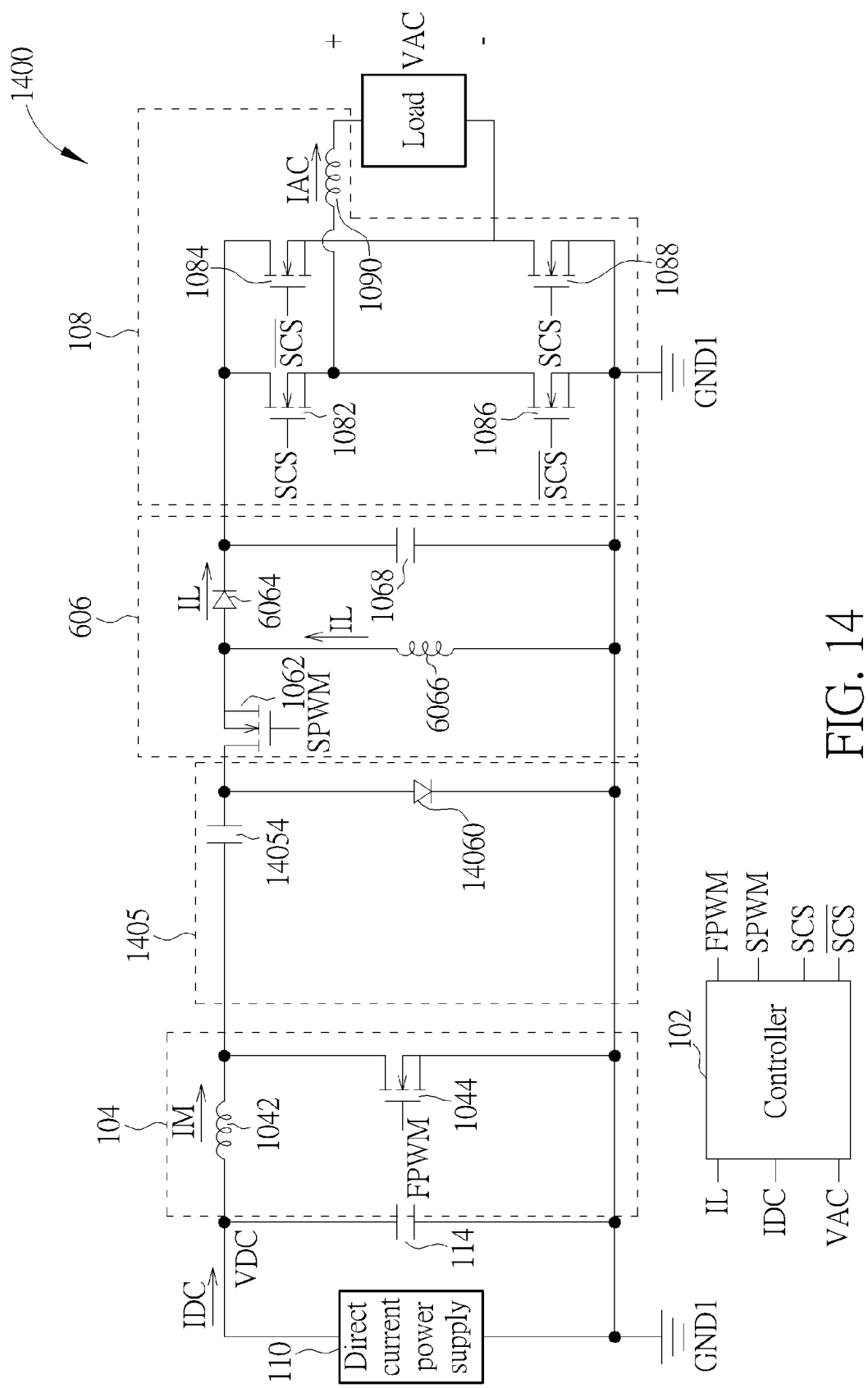
FIG. 14 is a diagram illustrating a current source inverter according to another embodiment.

Please refer to FIG. 14. FIG. 14 is a diagram illustrating a current source inverter 1400 (non-isolation type) according to another embodiment. As shown in FIG. 14, a difference between the current source inverter 1400 and the current source inverter 600 is that a buffer unit 1405 of the current source inverter 1400 is different from the buffer unit 605 of the current source inverter 600. As shown in FIG. 14, the buffer unit 1405 includes a first capacitor 14054 and a first diode 14060. The first capacitor 14054 has a first terminal coupled to the second terminal of the first inductor 1042, and a second terminal; and the first diode 14060 has a first terminal coupled to the second terminal of the first capacitor 14054, and a second terminal coupled to the ground GND1.

Figure 15:
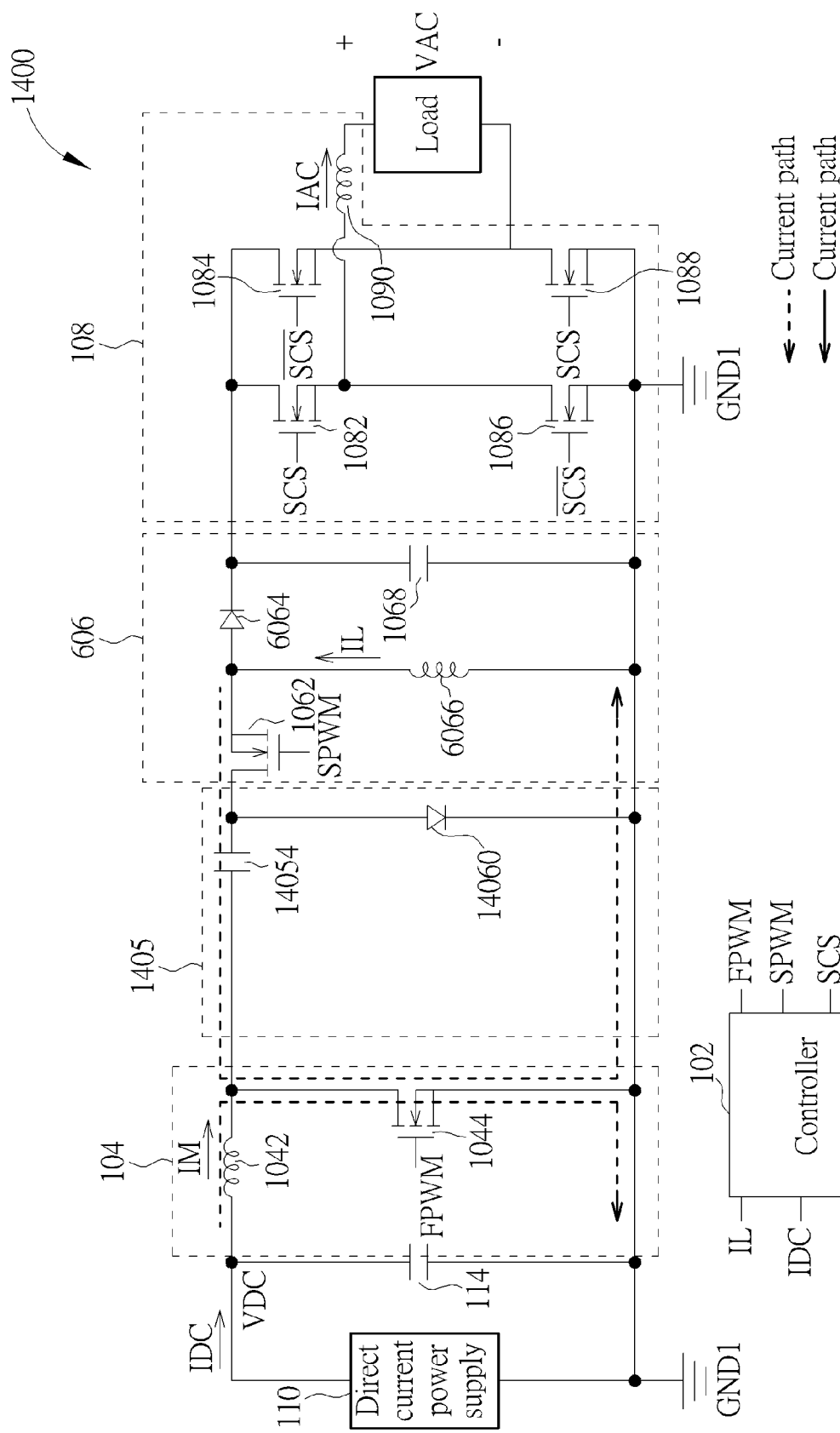
FIG. 15 is a diagram illustrating the current source inverter in a mode I.
Figure 16:
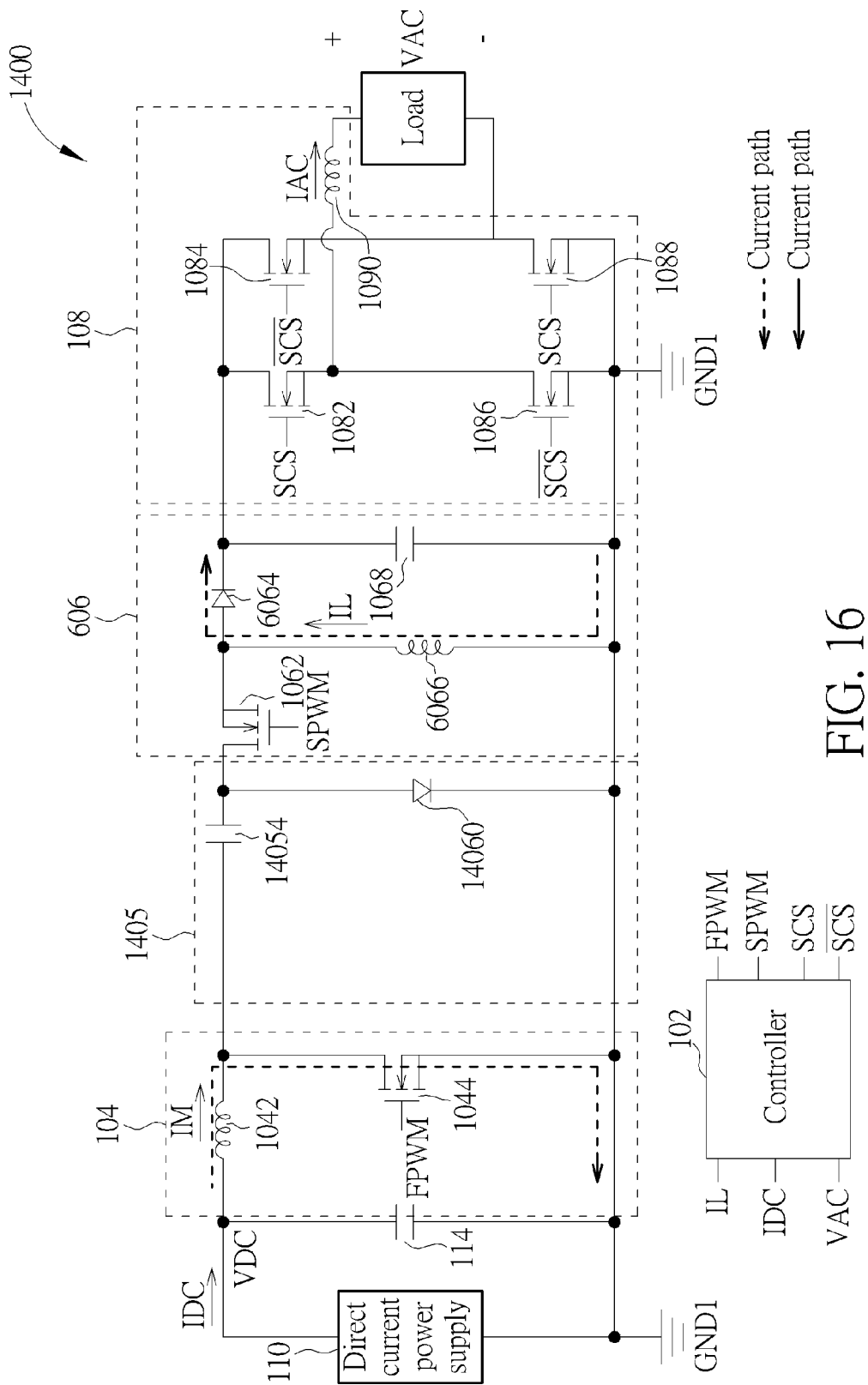
FIG. 16 is a diagram illustrating the current source inverter in a mode II.
Figure 17:
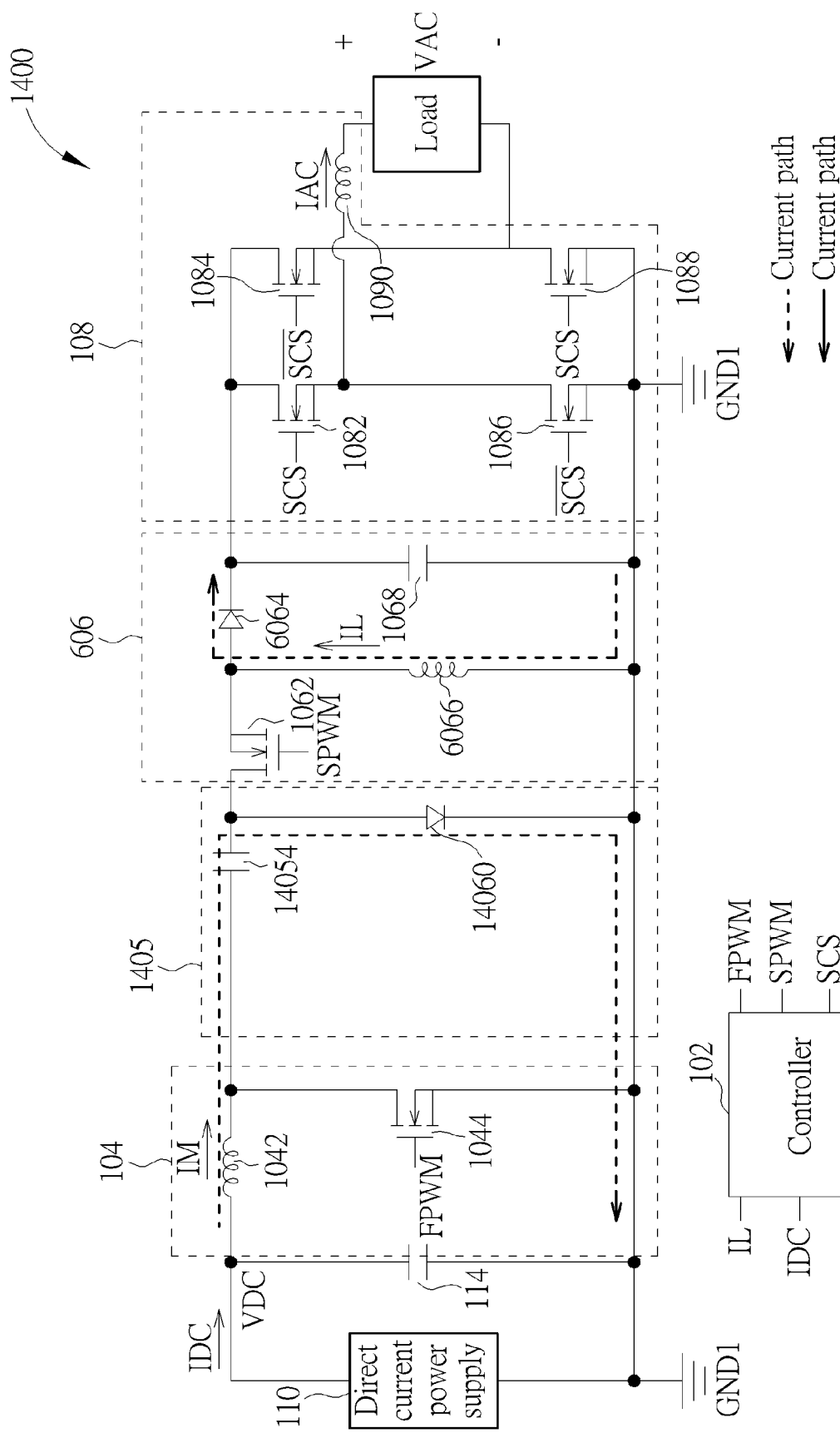
FIG. 17 is a diagram illustrating the current source inverter in a mode III.

Please refer to FIG. 15 to FIG. 17. FIG. 15 is a diagram illustrating the current source inverter 1400 in a mode I, FIG. 16 is a diagram illustrating the current source inverter 1400 in a mode II, and FIG. 17 is a diagram illustrating the current source inverter 1400 in a mode III.

As shown in FIG. 2 and FIG. 15, in the mode I, because the controller 102 enables the first pulse width modulation control signal FPWM and the second pulse width modulation control signal SPWM, the first switch 1044 and the second switch 1062 are turned on. Therefore, the input power PDC of the direct current power supply 110 is stored in the first inductor 1042, a part of power stored in the first capacitor 14054 of the buffer unit 1405 is transmitted to the second inductor 6066 of the modulating unit 606, and other part of the power stored in the first capacitor 14054 of the buffer unit 1405 is transmitted to the commutator 108 through the second inductor sinusoidal current IL of the modulating unit 606. Therefore, the part of the power stored in the first capacitor 14054 is stored in the second inductor 6066, and the other part of the power stored in the first capacitor 14054 is transmitted to the commutator 108 through the second inductor sinusoidal current IL of the modulating unit 606. Because the input power PDC of the direct current power supply 110 is continuously stored in the first inductor 1042, the first inductor current IM flowing through the first inductor 1042 is increased (as shown in FIG. 2). In addition, because the part of the power stored in the first capacitor 14054 is stored in the second inductor 6066, the second inductor sinusoidal current IL flowing through the second inductor 6066 is also increased (as shown in FIG. 2).

As shown in FIG. 2 and FIG. 16, in the mode II, when the output power PAC of the load 112 is satisfied, the controller 102 enables the first pulse width modulation control signal FPWM and disables the second pulse width modulation control signal SPWM, so the first switch 1044 is turned on and the second switch 1062 is turned off. Therefore, when the second switch 1062 is turned off, the alternating current IAC is generated by the second diode 6064, the third capacitor 1068, and the second inductor 6066, so the power stored in the second inductor 6066 can be transmitted to the commutator 108. But, because the direct current IDC is not yet increased to the direct current corresponding to the maximum power point of the direct current power supply 110, the first switch 1044 is continuously turned on, resulting in the input power PDC of the direct current power supply 110 being continuously stored in the first inductor 1042. Because the input power PDC of the direct current power supply 110 is continuously stored in the first inductor 1042, the first inductor current IM flowing through the first inductor 1042 is continuously increased (as shown in FIG. 2). In addition, because the power stored in the second inductor 6066 is transmitted to the commutator 108, the second inductor sinusoidal current IL flowing through the second inductor 6066 is decreased (as shown in FIG. 2).

As shown in FIG. 2 and FIG. 17, in the mode III, when the direct current IDC is increased to the direct current corresponding to the maximum power point of the direct current power supply 110, the controller 102 disables the first pulse width modulation control signal FPWM and the second pulse width modulation control signal SPWM, so the first switch 1044 and the second switch 1062 are turned off. Therefore, when the second switch 1062 is turned off, the alternating current IAC is generated by the second diode 6064, the third capacitor 1068, and the second inductor 6066, so the power stored in the second inductor 6066 can be transmitted to the commutator 108. Because the first switch 1044 is turned off, the power stored in the first inductor 1042 is stored in the first capacitor 14054 through the first diode 14060. Because the power stored in the first inductor 1042 is stored in the first capacitor 14054 through the first diode 14060, the first inductor current IM flowing through the first inductor 1042 is decreased (as shown in FIG. 2); and because the power stored in the second inductor 6066 is transmitted to the commutator 108, the second inductor sinusoidal current IL flowing through the second inductor 6066 is decreased (as shown in FIG. 2).

According to the mode I, the mode II, and the mode III of the current source inverter 1400, because the controller 102 can control turning-on and turning-off of the first switch 1044 and the second switch 1062 through the first pulse width modulation control signal FPWM and the second pulse width modulation control signal SPWM, low frequency current ripples inversely generated by sinusoidal power outputted by the modulating unit 606 can be absorbed by the buffer unit 1405, resulting in low frequency current ripple components of the input power PDC being decreased.

Figure 18:
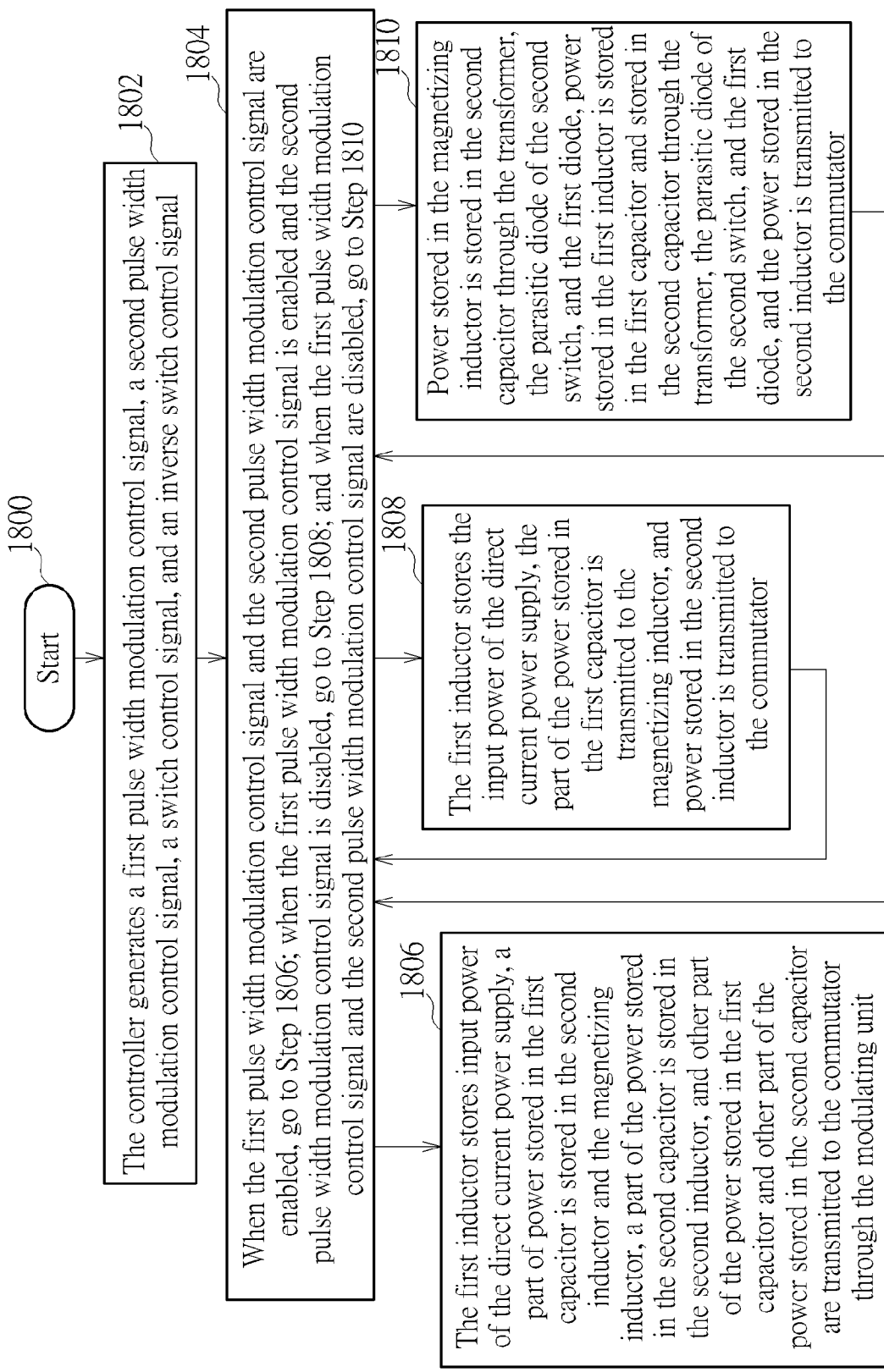
FIG. 18 is a flowchart illustrating an operation method of a current source inverter according to another embodiment.

Please refer to FIG. 1 to FIG. 5 and FIG. 18. FIG. 18 is a flowchart illustrating an operation method of a current source inverter according to another embodiment. The method in FIG. 18 is illustrated using the current source inverter 100 in FIG. 1. Detailed steps are as follows:

Step 1800: Start.

Step 1802: The controller 102 generates a first pulse width modulation control signal FPWM, a second pulse width modulation control signal SPWM, a switch control signal SCS, and an inverse switch control signal $\overline{SCS}$.

Step 1804: When the first pulse width modulation control signal FPWM and the second pulse width modulation control signal SPWM are enabled, go to Step 1806; when the first pulse width modulation control signal FPWM is enabled and the second pulse width modulation control signal SPWM is disabled, go to Step 1808; and when the first pulse width modulation control signal FPWM and the second pulse width modulation control signal SPWM are disabled, go to Step 1810.

Step 1806: The first inductor 1042 stores input power PDC of the direct current power supply 110, a part of power stored in the first capacitor 1054 is stored in the second inductor 1066 and the magnetizing inductor 1056, apart of the power stored in the second capacitor 1058 is stored in the second inductor 1066, and other part of the power stored in the first capacitor 1054 and other part of the power stored in the second capacitor 1058 are transmitted to the commutator 108 through the modulating unit 106, go to Step 1804.

Step 1808: The first inductor 1042 stores the input power PDC of the direct current power supply 110, the part of the power stored in the first capacitor 1054 is transmitted to the magnetizing inductor 1056, and power stored in the second inductor 1066 is transmitted to the commutator 108, go to Step 1804.

Step 1810: Power stored in the magnetizing inductor 1056 is stored in the second capacitor 1058 through the transformer 1052, the parasitic diode 10622 of the second switch 1062, and the first diode 1064, power stored in the first inductor 1042 is stored in the first capacitor 1054 and stored in the second capacitor 1058 through the transformer 1052, the parasitic diode 10622 of the second switch 1062, and the first diode 1064, and the power stored in the second inductor 1066 is transmitted to the commutator 108, go to Step 1804.

In Step 1802, as shown in FIG. 1, the controller 102 controls the enabling time of the first pulse width modulation control signal FPWM according to the direct current IDC and the maximum power point tracking algorithm, controls the enabling time of the second pulse width modulation control signal SPWM according to the second inductor sinusoidal current IL (corresponding to the output power PAC), and generates the switch control signal SCS and the inverse switch control signal $\overline{SCS}$ according to the frequency of the alternating current voltage VAC, wherein the enabling time of the first pulse width modulation control signal FPWM is greater than the enabling time of the second pulse width modulation control signal SPWM.

In Step 1806, as shown in FIG. 2 and FIG. 3, because the controller 102 enables the first pulse width modulation control signal FPWM and the second pulse width modulation control signal SPWM, the first switch 1044 and the second switch 1062 are turned on. Therefore, the input power PDC of the direct current power supply 110 is stored in the first inductor 1042, the part of the power stored in the first capacitor 1054 is transmitted to the magnetizing inductor 1056 and the second inductor 1066, the other part of the power stored in the first capacitor 1054 is transmitted to the commutator 108 through the second inductor sinusoidal current IL of the modulating unit 106, the part of the power stored in the second capacitor 1058 is transmitted to the second inductor 1066, and the other part of the power stored in the second capacitor 1058 is transmitted to the commutator 108 through the second inductor sinusoidal current IL of the modulating unit 106. Meanwhile, the first capacitor 1054 of the buffer unit 105 charges the magnetizing inductor 1056 of the buffer unit 105. Because the input power PDC of the direct current power supply 110 is stored in the first inductor 1042, the first inductor current IM flowing through the first inductor 1042 is increased (as shown in FIG. 2). In addition, because the part of the power stored in the first capacitor 1054 is stored in the second inductor 1066 and the part of the power stored in the second capacitor 1058 is stored in the second inductor 1066, the second inductor sinusoidal current IL flowing through the second inductor 1066 is also increased (as shown in FIG. 2). In addition, in the mode I, the controller 102 can determine the turning-on time of the first switch 1044 (that is, the enabling time of the first pulse width modulation control signal FPWM) according to the direct current IDC and the maximum power point tracking algorithm, and the controller 102 can control the turning-on time of the second switch 1062 according to the second inductor sinusoidal current IL.

In Step 1808, as shown in FIG. 2 and FIG. 4, when the output power PAC of the load 112 is satisfied, the controller 102 enables the first pulse width modulation control signal FPWM and disables the second pulse width modulation control signal SPWM, so the first switch 1044 is turned on and the second switch 1062 is turned off. Therefore, when the second switch 1062 is turned off, the alternating current IAC is generated by the first diode 1064, the third capacitor 1068, and the second inductor 1066, so the power stored in the second inductor 1066 can be transmitted to the commutator 108 through the second inductor sinusoidal current IL. But, because the direct current IDC is not yet increased to the direct current corresponding to the maximum power point of the direct current power supply 110, the first switch 1044 is continuously turned on, resulting in the input power PDC of the direct current power supply 110 being continuously stored in the first inductor 1042, and the power stored in the first capacitor 1054 of the buffer unit 105 being transmitted to the magnetizing inductor 1056 of the buffer unit 105 through the first switch 1044 (that is, the first capacitor 1054 of the buffer unit 105 continuously keeps charging the magnetizing inductor 1056 of the buffer unit 105). Because the input power PDC of the direct current power supply 110 is continuously stored in the first inductor 1042, the first inductor current IM flowing through the first inductor 1042 is continuously increased (as shown in FIG. 2). In addition, because the power stored in the second inductor 1066 is transmitted to the commutator 108, the second inductor sinusoidal current IL flowing through the second inductor 1066 is decreased (as shown in FIG. 2).

In Step 1810, as shown in FIG. 2 and FIG. 5, when direct current IDC is increased to the direct current corresponding to the maximum power point of the direct current power supply 110, the controller 102 disables the first pulse width modulation control signal FPWM and the second pulse width modulation control signal SPWM, so the first switch 1044 and the second switch 1062 are turned off. Therefore, when the second switch 1062 is turned off, the alternating current IAC is generated by the first diode 1064, the third capacitor 1068, and the second inductor 1066, so the power stored in the second inductor 1066 can be transmitted to the commutator 108. Because the first switch 1044 is turned off, the power stored in the first inductor 1042 is stored in the first capacitor 1054 and stored in the second capacitor 1058 through the transformer 1052, the parasitic diode 10622 of the second switch 1062, and the first diode 1064. In addition, the power stored in the magnetizing inductor 1056 can also be stored in the second capacitor 1058 through the transformer 1052, the parasitic diode 10622 of the second switch 1062, and the first diode 1064. Because the power stored in the first inductor 1042 is stored in the first capacitor 1054 and stored in the second capacitor 1058 through the transformer 1052, the parasitic diode 10622 of the second switch 1062, and the first diode 1064, the first inductor current IM flowing through the first inductor 1042 is decreased (as shown in FIG. 2); and because the power stored in the second inductor 1066 is transmitted to the commutator 108, the second inductor sinusoidal current IL flowing through the second inductor 1066 is decreased (as shown in FIG. 2).

Figure 19:
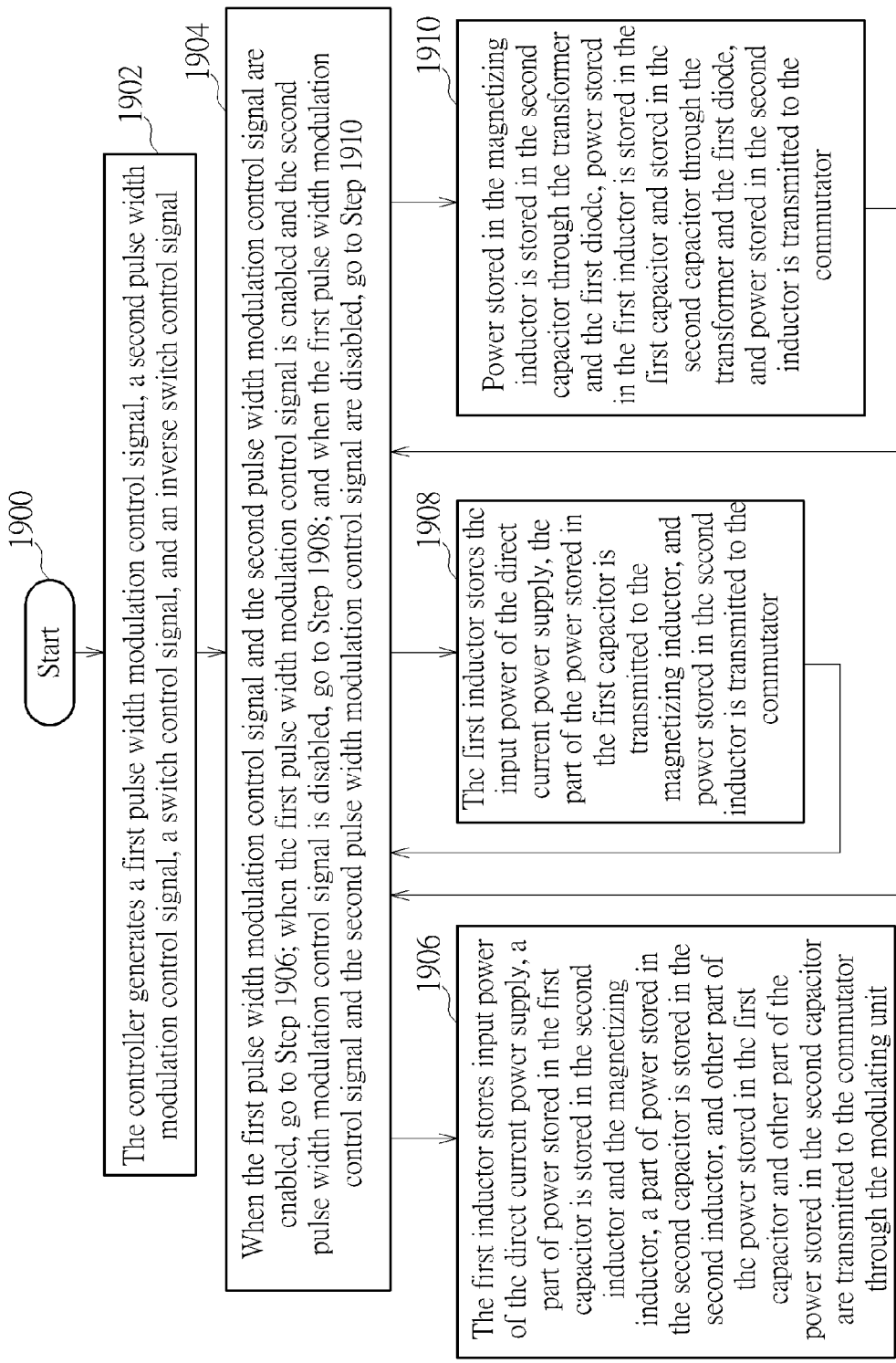
FIG. 19 is a flowchart illustrating an operation method of a current source inverter according to another embodiment.

Please refer to FIG. 2, FIG. 6 to FIG. 9, and FIG. 19. FIG. 19 is a flowchart illustrating an operation method of a current source inverter according to another embodiment. The method in FIG. 19 is illustrated using the current source inverter 600 in FIG. 6. Detailed steps are as follows:

Step 1900: Start.

Step 1902: The controller 102 generates a first pulse width modulation control signal FPWM, a second pulse width modulation control signal SPWM, a switch control signal SCS, and an inverse switch control signal $\overline{SCS}$.

Step 1904: When the first pulse width modulation control signal FPWM and the second pulse width modulation control signal SPWM are enabled, go to Step 1906; when the first pulse width modulation control signal FPWM is enabled and the second pulse width modulation control signal SPWM is disabled, go to Step 1908; and when the first pulse width modulation control signal FPWM and the second pulse width modulation control signal SPWM are disabled, go to Step 1910.

Step 1906: The first inductor 1042 stores input power PDC of the direct current power supply 110, a part of power stored in the first capacitor 1054 is stored in the second inductor 6066 and the magnetizing inductor 1056, a part of power stored in the second capacitor 1058 is stored in the second inductor 6066, and other part of the power stored in the first capacitor 1054 and other part of the power stored in the second capacitor 1058 are transmitted to the commutator 108 through the modulating unit 606, go to Step 1904.

Step 1908: The first inductor 1042 stores the input power PDC of the direct current power supply 110, the part of the power stored in the first capacitor 1054 is transmitted to the magnetizing inductor 1056, and power stored in the second inductor 6066 is transmitted to the commutator 108, go to Step 1904.

Step 1910: Power stored in the magnetizing inductor 1056 is stored in the second capacitor 1058 through the transformer 6052 and the first diode 6060, power stored in the first inductor 1042 is stored in the first capacitor 1054 and stored in the second capacitor 1058 through the transformer 6052 and the first diode 6060, and power stored in the second inductor 6066 is transmitted to the commutator 108, go to Step 1904.

A difference between the embodiment in FIG. 19 and the embodiment in FIG. 18 is that in Step 1910, as shown in FIG. 2 and FIG. 9, when the direct current IDC is increased to the direct current corresponding to the maximum power point of the direct current power supply 110, the controller 102 disables the first pulse width modulation control signal FPWM and the second pulse width modulation control signal SPWM, so the first switch 1044 and the second switch 1062 are turned off. Therefore, when the second switch 1062 is turned off, the alternating current IAC is generated by the second diode 6064, the third capacitor 1068, and the second inductor 6066, so the power stored in the second inductor 6066 can be transmitted to the commutator 108. Because the first switch 1044 is turned off, the power stored in the first inductor 1042 is stored in the first capacitor 1054 and stored in the second capacitor 1058 through the transformer 6052 and the first diode 6060. In addition, the power stored in the magnetizing inductor 1056 can also be stored in the second capacitor 1058 through the transformer 6052 and the first diode 6060. In addition, subsequent operational principles of the embodiment in FIG. 19 are the same as those of the embodiment in FIG. 18, so further description thereof is omitted for simplicity.

Figure 20:
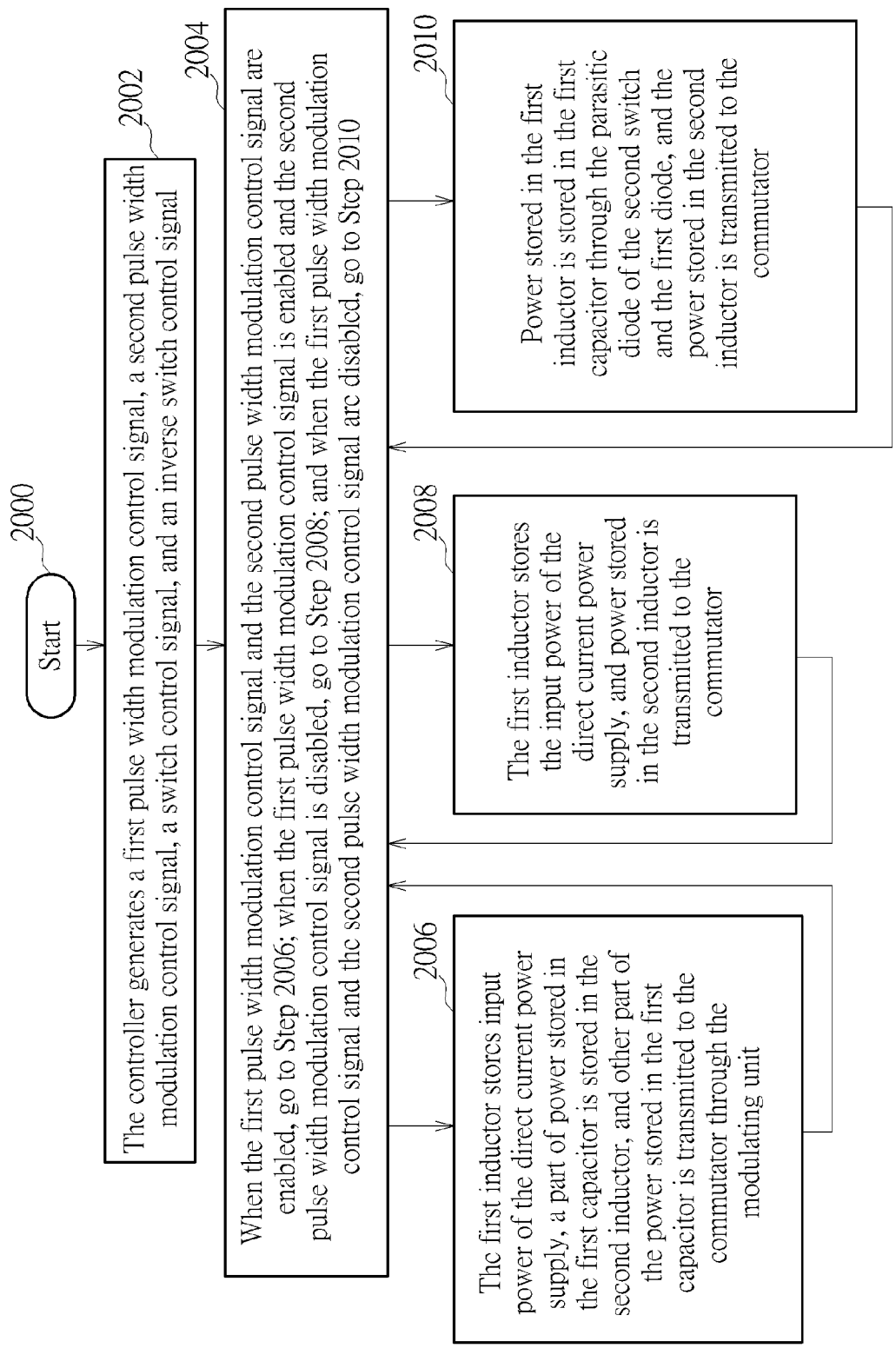
FIG. 20 is a flowchart illustrating an operation method of a current source inverter according to another embodiment.

Please refer to FIG. 2, FIG. 10 to FIG. 13, and FIG. 20. FIG. 20 is a flowchart illustrating an operation method of a current source inverter according to another embodiment. The method in FIG. 20 is illustrated using the current source inverter 1000 in FIG. 10. Detailed steps are as follows:

Step 2000: Start.

Step 2002: The controller 102 generates a first pulse width modulation control signal FPWM, a second pulse width modulation control signal SPWM, a switch control signal SCS, and an inverse switch control signal $\overline{SCS}$.

Step 2004: When the first pulse width modulation control signal FPWM and the second pulse width modulation control signal SPWM are enabled, go to Step 2006; when the first pulse width modulation control signal FPWM is enabled and the second pulse width modulation control signal SPWM is disabled, go to Step 2008; and when the first pulse width modulation control signal FPWM and the second pulse width modulation control signal SPWM are disabled, go to Step 2010.

Step 2006: The first inductor 1042 stores input power PDC of the direct current power supply 110, a part of power stored in the first capacitor 10054 is stored in the second inductor 1066, and other part of the power stored in the first capacitor 10054 is transmitted to the commutator 108 through the modulating unit 106, go to Step 2004.

Step 2008: The first inductor 1042 stores the input power PDC of the direct current power supply 110, and power stored in the second inductor 1066 is transmitted to the commutator 108, go to Step 2004.

Step 2010: Power stored in the first inductor 1042 is stored in the first capacitor 10054 through the parasitic diode 10622 of the second switch 1062 and the first diode 1064, and the power stored in the second inductor 1066 is transmitted to the commutator 108, go to Step 2004.

In Step 2006, as shown in FIG. 2 and FIG. 11, because the controller 102 enables the first pulse width modulation control signal FPWM and the second pulse width modulation control signal SPWM, the first switch 1044 and the second switch 1062 are turned on. Therefore, the input power PDC of the direct current power supply 110 is stored in the first inductor 1042, the part of the power stored in the first capacitor 10054 is transmitted to the second inductor 1066 of the modulating unit 106, and the other part of the power stored in the first capacitor 10054 is transmitted to the commutator 108 through the second inductor sinusoidal current IL of the modulating unit 106.

In Step 2008, as shown in FIG. 2 and FIG. 12, when the output power PAC of the load 112 is satisfied, the controller 102 enables the first pulse width modulation control signal FPWM and disables the second pulse width modulation control signal SPWM, so the first switch 1044 is turned on and the second switch 1062 is turned off. Therefore, when the second switch 1062 is turned off, the alternating current IAC is generated by the first diode 1064, the third capacitor 1068, and the second inductor 1066, so the power stored in the second inductor 1066 can be transmitted to the commutator 108. But, because the direct current IDC is not yet increased to the direct current corresponding to the maximum power point of the direct current power supply 110, the first switch 1044 is continuously turned on, resulting in the input power PDC of the direct current power supply 110 being continuously stored in the first inductor 1042.

In Step 2010, as shown in FIG. 2 and FIG. 13, when the direct current IDC is increased to the direct current corresponding to the maximum power point of the direct current power supply 110, the controller 102 disables the first pulse width modulation control signal FPWM and the second pulse width modulation control signal SPWM, so the first switch 1044 and the second switch 1062 are turned off. Therefore, when the second switch 1062 is turned off, the alternating current IAC is generated by the first diode 1064, the third capacitor 1068, and the second inductor 1066, so the power stored in the second inductor 1066 can be transmitted to the commutator 108. Because the first switch 1044 is turned off, the power stored in the first inductor 1042 is stored in the first capacitor 10054 through the parasitic diode 10622 of the second switch 1062 and the first diode 1064.

Figure 21:
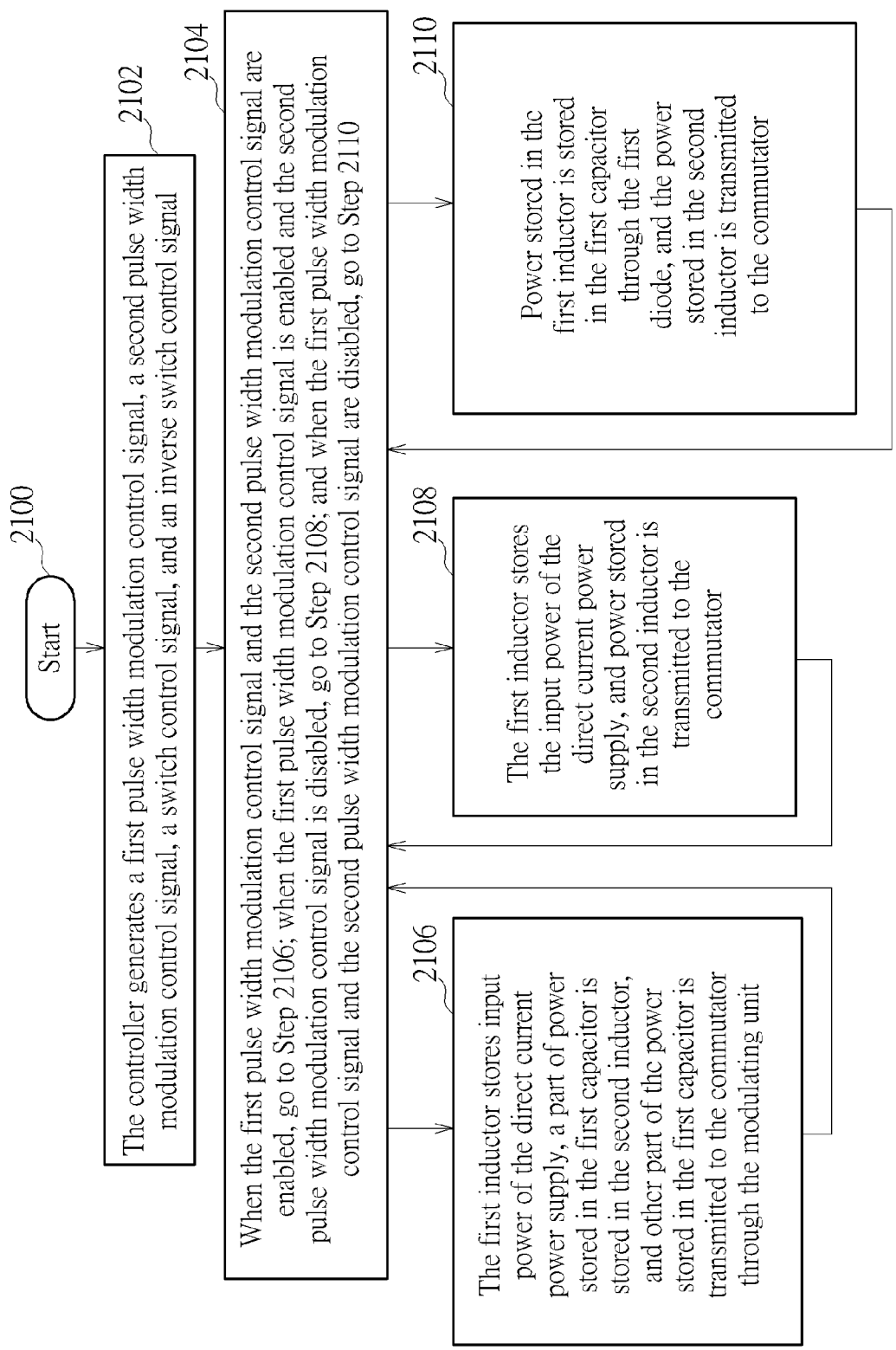
FIG. 21 is a flowchart illustrating an operation method of a current source inverter according to another embodiment.

Please refer to FIG. 2, FIG. 14 to FIG. 17, and FIG. 21. FIG. 21 is a flowchart illustrating an operation method of a current source inverter according to another embodiment. The method in FIG. 21 is illustrated using the current source inverter 1400 in FIG. 14. Detailed steps are as follows:

Step 2100: Start.

Step 2102: The controller 102 generates a first pulse width modulation control signal FPWM, a second pulse width modulation control signal SPWM, a switch control signal SCS, and an inverse switch control signal $\overline{SCS}$.

Step 2104: When the first pulse width modulation control signal FPWM and the second pulse width modulation control signal SPWM are enabled, go to Step 2106; when the first pulse width modulation control signal FPWM is enabled and the second pulse width modulation control signal SPWM is disabled, go to Step 2108; and when the first pulse width modulation control signal FPWM and the second pulse width modulation control signal SPWM are disabled, go to Step 2110.

Step 2106: The first inductor 1042 stores input power PDC of the direct current power supply 110, a part of power stored in the first capacitor 14054 is stored in the second inductor 6066, and other part of the power stored in the first capacitor 14054 is transmitted to the commutator 108 through the modulating unit 606, go to Step 2104.

Step 2108: The first inductor 1042 stores the input power PDC of the direct current power supply 110, and power stored in the second inductor 6066 is transmitted to the commutator 108, go to Step 2104.

Step 2110: Power stored in the first inductor 1042 is stored in the first capacitor 14054 through the first diode 14060, and the power stored in the second inductor 6066 is transmitted to the commutator 108, go to Step 2104.

A difference between the embodiment in FIG. 21 and the embodiment in FIG. 20 is that in Step 2110, as shown in FIG. 2 and FIG. 17, when the direct current IDC is increased to the direct current corresponding to the maximum power point of the direct current power supply 110, the controller 102 disables the first pulse width modulation control signal FPWM and the second pulse width modulation control signal SPWM, so the first switch 1044 and the second switch 1062 are turned off. Therefore, when the second switch 1062 is turned off, the alternating current IAC is generated by the second diode 6064, the third capacitor 1068, and the second inductor 6066, so the power stored in the second inductor 6066 can be transmitted to the commutator 108. Because the first switch 1044 is turned off, the power stored in the first inductor 1042 is stored in the first capacitor 14054 through the first diode 14060. In addition, subsequent operational principles of the embodiment in FIG. 21 are the same as those of the embodiment in FIG. 20, so further description thereof is omitted for simplicity.

To sum up, the current source inverter and the operation method thereof utilize the input unit to execute a first corresponding operation according to a first pulse width modulation control signal, the modulating unit to execute a second corresponding operation according to a second pulse width modulation control signal, and the buffer unit to execute a third corresponding operation according to the second pulse width modulation control signal. Therefore, compared to the prior art, the present invention has advantages as follows: first, because the controller can control turning-on and turning-off of the first switch and the second switch through the first pulse width modulation control signal and the second pulse width modulation control signal, low frequency current ripples inversely generated by sinusoidal power outputted by the modulating unit modulating unit can be absorbed by the buffer unit, resulting in low frequency current ripple components of input power being decreased, to increase power conversion efficiency of the current source inverter; second, when the current source inverter (isolation type) operates, because a voltage drop of the first capacitor is connected to a voltage drop of the second capacitor in series, the voltage drop of the second capacitor does not need to be higher than a voltage drop of the load, resulting in the second switch easily transmitting power to the load and not enduring stress corresponding to longer turning-on time, and operation range of the direct current power supply being also very large; third, because the first inductor and the second inductor of the current source inverter operate in a continuous current mode (CCM), current stress on the first switch and the second switch is not very large; and fourth, the second switches of the current source inverters shown in FIGS. 1, 10 can be still turned on through parasitic diodes thereof during a mode III, so the second switches of the current source inverters shown in FIGS. 1, 10 have a zero voltage switching characteristic when the second switches of the current source inverters shown in FIGS. 1, 10 are switched from the mode III to a mode I, resulting in switching loss of the second switches of the current source inverters shown in FIGS. 1, 10 being decreased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A current source inverter, comprising:
   a controller for generating a switch control signal, an inverse switch control signal, a first pulse width modulation control signal, and a second pulse width modulation control signal;
   an input unit coupled to a direct current power supply, and for storing and transmitting input power of the direct current power supply according to the first pulse width modulation control signal;
   a buffer unit coupled to the input unit for receiving and transmitting the input power, wherein the buffer unit comprises:
      a transformer;
      a first capacitor having a first terminal coupled to the input unit, and a second terminal coupled to the transformer;
      a magnetizing inductor having a first terminal coupled to the second terminal of the first capacitor and the transformer, and a second terminal coupled to first ground and the transformer; and
      a second capacitor having a first terminal coupled to the transformer, and a second terminal coupled to the modulating unit;
   a modulating unit coupled to the buffer unit for receiving the input power according to the second pulse width modulation control signal, and generating and outputting a full-wave rectified sinusoidal current according to the input power; and
   a commutator coupled to the modulating unit for converting the full-wave rectified sinusoidal current into an alternating current according to the switch control signal and the inverse switch control signal, and outputting the alternating current to a load, wherein a frequency of the switch control signal and a frequency of the inverse switch control signal are equal to a frequency of the load;
   wherein the controller controls an enabling time of the second pulse width modulation control signal according to the sinusoidal current, and an enabling time of the first pulse width modulation control signal is greater than the enabling time of the second pulse width modulation control signal.

2. The current source inverter of claim 1, further comprising:
   a filtering capacitor having a first terminal coupled to a first terminal of the direct current power supply, and a second terminal coupled to a second terminal of the direct current power supply and first ground, wherein the filtering capacitor is used for filtering high frequency current ripples of a direct current voltage provided by the direct current power supply.

3. The current source inverter of claim 2, wherein the input power is equal to a product of the direct current voltage and a direct current provided by the direct current power supply, wherein the direct current corresponds to the maximum power point tracking, and the controller controls the enabling time of the first pulse width modulation control signal according to the direct current and a maximum power point tracking algorithm.

4. The current source inverter of claim 1, wherein output power of the load is equal to a product of the alternating current and a voltage of the load.

5. The current source inverter of claim 1, wherein the direct current power supply is a solar panel or a stable direct current power supply.

6. The current source inverter of claim 5, wherein the input unit has a maximum power point tracking function.

7. The current source inverter of claim 6, wherein the input unit comprises:
 a first inductor having a first terminal coupled to a first terminal of the direct current power supply, and a second terminal; and
 a first switch having a first terminal coupled to the second terminal of the first inductor, a second terminal for receiving the first pulse width modulation control signal, and a third terminal coupled to first ground, wherein the first switch is turned on and turned off according to the first pulse width modulation control signal.

8. The current source inverter of claim 1, wherein the modulating unit comprises:
 a second switch having a first terminal coupled to the second terminal of the second capacitor, a second terminal for receiving the second pulse width modulation control signal, and a third terminal, wherein the second switch is turned on and turned off according to the second pulse width modulation control signal;
 a first diode having a first terminal coupled to second ground, and a second terminal coupled to the third terminal of the second switch;
 a second inductor having a first terminal coupled to the second terminal of the first diode, and a second terminal; and
 a third capacitor having a first terminal coupled to the second terminal of the second inductor, and a second terminal coupled to the second ground.

9. The current source inverter of claim 8, wherein the commutator comprises:
 a third switch having a first terminal coupled to the first terminal of the third capacitor, a second terminal for receiving the switch control signal, and a third terminal;
 a fourth switch having a first terminal coupled to the first terminal of the third capacitor, a second terminal for receiving the inverse switch control signal, and a third terminal coupled to a second terminal of the load;
 a fifth switch having a first terminal coupled to the third terminal of the third switch, a second terminal for receiving the inverse switch control signal, and a third terminal coupled to the second ground;
 a sixth switch having a first terminal coupled to the third terminal of the fourth switch, a second terminal for receiving the switch control signal, and a third terminal coupled to the second ground; and
 a third inductor having a first terminal coupled to the third terminal of the third switch, and a second terminal coupled to a first terminal of the load.

10. The current source inverter of claim 9, wherein when a first switch of the input unit and the second switch are turned on, the input power is stored in a first inductor of the input unit; a part of power stored in the first capacitor is stored in the second inductor and the magnetizing inductor, and other part of the power stored in the first capacitor is transmitted to the commutator through the modulating unit; a part of power stored in the second capacitor is stored in the second inductor, and other part of the power stored in the second capacitor is transmitted to the commutator through the modulating unit.

11. The current source inverter of claim 9, wherein when the second switch is turned off and a first switch of the input unit is turned on, the input power is stored in a first inductor of the input unit, power stored in the first capacitor is transmitted to the magnetizing inductor through the first switch, and power stored in the second inductor is transmitted to the commutator.

12. The current source inverter of claim 9, wherein when a first switch of the input unit and the second switch are turned off, power stored in the magnetizing inductor is stored in the second capacitor through the transformer, a parasitic diode of the second switch, and the first diode, power stored in a first inductor of the input unit is stored in the first capacitor, and stored in the second capacitor through the transformer, the parasitic diode of the second switch, and the first diode, and power stored in the second inductor is transmitted to the commutator.

13. The current source inverter of claim 9, wherein when a first switch of the input unit and the second switch are turned off, power stored in the magnetizing inductor is stored in the second capacitor through the transformer and the first diode, power stored in a first inductor of the input unit is stored in the first capacitor, and stored in the second capacitor through the transformer and the first diode, and power stored in the second inductor is transmitted to the commutator.

14. A current source inverter, comprising:
 a controller for generating a switch control signal, an inverse switch control signal, a first pulse width modulation control signal, and a second pulse width modulation control signal;
 an input unit coupled to a direct current power supply, and for storing and transmitting input power of the direct current power supply according to the first pulse width modulation control signal;
 a buffer unit coupled to the input unit for receiving and transmitting the input power, wherein the buffer unit comprises:
  a transformer;
  a first capacitor having a first terminal coupled to the input unit, and a second terminal coupled to the transformer;
  a magnetizing inductor having a first terminal coupled to the second terminal of the first capacitor and the transformer, and a second terminal coupled to first ground and the transformer; and
  a second capacitor having a first terminal coupled to the transformer, and a second terminal coupled to the modulating unit; and
  a first diode having a first terminal coupled to the second terminal of the second capacitor, and a second terminal coupled to second ground;
 a modulating unit coupled to the buffer unit for receiving the input power according to the second pulse width modulation control signal, and generating and outputting a full-wave rectified sinusoidal current according to the input power; and
 a commutator coupled to the modulating unit for converting the full-wave rectified sinusoidal current into an alternating current according to the switch control signal and the inverse switch control signal, and outputting the alternating current to a load, wherein a frequency of the switch control signal and a frequency of the inverse switch control signal are equal to a frequency of the load;
 wherein the controller controls an enabling time of the second pulse width modulation control signal according to the sinusoidal current, and an enabling time of the first pulse width modulation control signal is greater than the enabling time of the second pulse width modulation control signal.

15. The current source inverter of claim 14, wherein the modulating unit comprises:
   a second switch having a first terminal coupled to the second terminal of the second capacitor, a second terminal for receiving the second pulse width modulation control signal, and a third terminal, wherein the second switch is turned on and turned off according to the second pulse width modulation control signal;
   a second inductor having a first terminal coupled to the third terminal of the second switch, and a second terminal coupled to the second ground;
   a second diode having a first terminal coupled to the third terminal of the second switch, and a second terminal; and
   a third capacitor having a first terminal coupled to the second terminal of the second diode, and a second terminal coupled to the second ground.

16. The current source inverter of claim 15, wherein the commutator comprises:
   a third switch having a first terminal coupled to the first terminal of the third capacitor, a second terminal for receiving the switch control signal, and a third terminal;
   a fourth switch having a first terminal coupled to the first terminal of the third capacitor, a second terminal for receiving the inverse switch control signal, and a third terminal coupled to a second terminal of the load;
   a fifth switch having a first terminal coupled to the third terminal of the third switch, a second terminal for receiving the inverse switch control signal, and a third terminal coupled to the second ground;
   a sixth switch having a first terminal coupled to the third terminal of the fourth switch, a second terminal for receiving the switch control signal, and a third terminal coupled to the second ground; and
   a third inductor having a first terminal coupled to the third terminal of the third switch, and a second terminal coupled to a first terminal of the load.

17. The current source inverter of claim 16, wherein when a first switch of the input unit and the second switch are turned on, the input power is stored in a first inductor of the input unit; a part of power stored in the first capacitor is stored in the second inductor and the magnetizing inductor, and other part of the power stored in the first capacitor is transmitted to the commutator through the modulating unit; a part of power stored in the second capacitor is stored in the second inductor, and other part of the power stored in the second capacitor is transmitted to the commutator through the modulating unit.

18. The current source inverter of claim 16, wherein when the second switch is turned off and a first switch of the input unit is turned on, the input power is stored in a first inductor of the input unit, power stored in the first capacitor is transmitted to the magnetizing inductor through the first switch, and power stored in the second inductor is transmitted to the commutator.

19. The current source inverter of claim 16, wherein when a first switch of the input unit and the second switch are turned off, power stored in the magnetizing inductor is stored in the second capacitor through the transformer, a parasitic diode of the second switch, and the first diode, power stored in a first inductor of the input unit is stored in the first capacitor, and stored in the second capacitor through the transformer, the parasitic diode of the second switch, and the first diode, and power stored in the second inductor is transmitted to the commutator.

20. The current source inverter of claim 16, wherein when a first switch of the input unit and the second switch are turned off, power stored in the magnetizing inductor is stored in the second capacitor through the transformer and the first diode, power stored in a first inductor of the input unit is stored in the first capacitor, and stored in the second capacitor through the transformer and the first diode, and power stored in the second inductor is transmitted to the commutator.

21. A current source inverter, comprising:
   a controller for generating a switch control signal, an inverse switch control signal, a first pulse width modulation control signal, and a second pulse width modulation control signal;
   an input unit coupled to a direct current power supply, and for storing and transmitting input power of the direct current power supply according to the first pulse width modulation control signal;
   a buffer unit coupled to the input unit for receiving and transmitting the input power, wherein the buffer unit comprises:
      a first capacitor having a first terminal coupled to the input unit, and a second terminal coupled to the modulating unit;
   a modulating unit coupled to the buffer unit for receiving the input power according to the second pulse width modulation control signal, and generating and outputting a full-wave rectified sinusoidal current according to the input power, wherein the modulating unit comprises:
      a second switch having a first terminal coupled to the second terminal of the first capacitor, a second terminal for receiving the second pulse width modulation control signal, and a third terminal, wherein the second switch is turned on and turned off according to the second pulse width modulation control signal;
      a first diode having a first terminal coupled to the third terminal of the second switch, and a second terminal coupled to first ground;
      a second inductor having a first terminal coupled to the first terminal of the first diode, and a second terminal; and
      a second capacitor having a first terminal coupled to the second terminal of the second inductor, and a second terminal coupled to the first ground; and
   a commutator coupled to the modulating unit for converting the full-wave rectified sinusoidal current into an alternating current according to the switch control signal and the inverse switch control signal, and outputting the alternating current to a load, wherein a frequency of the switch control signal and a frequency of the inverse switch control signal are equal to a frequency of the load;
   wherein the controller controls an enabling time of the second pulse width modulation control signal according to the sinusoidal current, and an enabling time of the first pulse width modulation control signal is greater than the enabling time of the second pulse width modulation control signal.

22. The current source inverter of claim 21, wherein the commutator comprises:
   a third switch having a first terminal coupled to the first terminal of the second capacitor, a second terminal for receiving the switch control signal, and a third terminal;
   a fourth switch having a first terminal coupled to the first terminal of the second capacitor, a second terminal for receiving the inverse switch control signal, and a third terminal coupled to a second terminal of the load;

a fifth switch having a first terminal coupled to the third terminal of the third switch, a second terminal for receiving the inverse switch control signal, and a third terminal coupled to the first ground;

a sixth switch having a first terminal coupled to the third terminal of the fourth switch, a second terminal for receiving the switch control signal, and a third terminal coupled to the first ground; and a third inductor having a first terminal coupled to the third terminal of the third switch, and a second terminal coupled to a first terminal of the load.

23. The current source inverter of claim 22, wherein when a first switch of the input unit and the second switch are turned on, the input power is stored in a first inductor of the input unit, a part of power stored in the first capacitor is stored in the second inductor, and other part of the power stored in the first capacitor is transmitted to the commutator through the modulating unit.

24. The current source inverter of claim 22, wherein when the second switch is turned off and a first switch of the input unit is turned on, the input power is stored in a first inductor of the input unit, and power stored in the second inductor is transmitted to the commutator.

25. The current source inverter of claim 22, wherein when a first switch of the input unit and the second switch are turned off, power stored in a first inductor of the input unit is stored in the first capacitor through a parasitic diode of the second switch and the first diode, and power stored in the second inductor is transmitted to the commutator.

26. The current source inverter of claim 22, wherein when a first switch of the input unit and the second switch are turned off, power stored in a first inductor of the input unit is stored in the first capacitor through the first diode, and power stored in the second inductor is transmitted to the commutator.

27. A current source inverter, comprising:
a controller for generating a switch control signal, an inverse switch control signal, a first pulse width modulation control signal, and a second pulse width modulation control signal;
an input unit coupled to a direct current power supply, and for storing and transmitting input power of the direct current power supply according to the first pulse width modulation control signal;
a buffer unit coupled to the input unit for receiving and transmitting the input power, wherein the buffer unit comprises:
  a first capacitor having a first terminal coupled to the input unit, and a second terminal; and
  a first diode having a first terminal coupled to the second terminal of the first capacitor, and a second terminal coupled to first ground;
a modulating unit coupled to the buffer unit for receiving the input power according to the second pulse width modulation control signal, and generating and outputting a full-wave rectified sinusoidal current according to the input power, wherein the modulating unit comprises:
  a second switch having a first terminal coupled to the second terminal of the first capacitor, a second terminal for receiving the second pulse width modulation control signal, and a third terminal, wherein the second switch is turned on and turned off according to the second pulse width modulation control signal;
  a second inductor having a first terminal coupled to the third terminal of the second switch, and a second terminal coupled to the first ground;
  a second diode having a first terminal coupled to the third terminal of the second switch, and a second terminal; and
  a second capacitor having a first terminal coupled to the second terminal of the second diode, and a second terminal coupled to the first ground; and
a commutator coupled to the modulating unit for converting the full-wave rectified sinusoidal current into an alternating current according to the switch control signal and the inverse switch control signal, and outputting the alternating current to a load, wherein a frequency of the switch control signal and a frequency of the inverse switch control signal are equal to a frequency of the load;
wherein the controller controls an enabling time of the second pulse width modulation control signal according to the sinusoidal current, and an enabling time of the first pulse width modulation control signal is greater than the enabling time of the second pulse width modulation control signal.

28. The current source inverter of claim 27, wherein the commutator comprises:
a third switch having a first terminal coupled to the first terminal of the second capacitor, a second terminal for receiving the switch control signal, and a third terminal;
a fourth switch having a first terminal coupled to the first terminal of the second capacitor, a second terminal for receiving the inverse switch control signal, and a third terminal coupled to a second terminal of the load;
a fifth switch having a first terminal coupled to the third terminal of the third switch, a second terminal for receiving the inverse switch control signal, and a third terminal coupled to the first ground;
a sixth switch having a first terminal coupled to the third terminal of the fourth switch, a second terminal for receiving the switch control signal, and a third terminal coupled to the first ground; and
a third inductor having a first terminal coupled to the third terminal of the third switch, and a second terminal coupled to a first terminal of the load.

29. The current source inverter of claim 28, wherein when a first switch of the input unit and the second switch are turned on, the input power is stored in a first inductor of the input unit, a part of power stored in the first capacitor is stored in the second inductor, and other part of the power stored in the first capacitor is transmitted to the commutator through the modulating unit.

30. The current source inverter of claim 28, wherein when the second switch is turned off and a first switch of the input unit is turned on, the input power is stored in a first inductor of the input unit, and power stored in the second inductor is transmitted to the commutator.

31. The current source inverter of claim 28, wherein when a first switch of the input unit and the second switch are turned off, power stored in a first inductor of the input unit is stored in the first capacitor through a parasitic diode of the second switch and the first diode, and power stored in the second inductor is transmitted to the commutator.

32. The current source inverter of claim 28, wherein when a first switch of the input unit and the second switch are turned off, power stored in a first inductor of the input unit is stored in the first capacitor through the first diode, and power stored in the second inductor is transmitted to the commutator.

* * * * *